US012589806B2

(12) United States Patent
Colasse et al.

(10) Patent No.: US 12,589,806 B2
(45) Date of Patent: Mar. 31, 2026

(54) METHOD FOR EXTENDING OR RETRACTING THE WHEELS OF AN AERIAL WORK PLATFORM MOUNTED ON PIVOTING ARMS

(71) Applicant: HAULOTTE GROUP, Lorette (FR)

(72) Inventors: Arnaud Colasse, Lyons (FR); Remy Cognet, La Grand Croix (FR); Abel Duro, L'Horme (FR)

(73) Assignee: HAULOTTE GROUP, Lorette (FR)

( * ) Notice: Subject to any disclaimer, the term of this patent is extended or adjusted under 35 U.S.C. 154(b) by 512 days.

(21) Appl. No.: 18/018,662

(22) PCT Filed: Jul. 28, 2021

(86) PCT No.: PCT/IB2021/056848
§ 371 (c)(1),
(2) Date: Jan. 30, 2023

(87) PCT Pub. No.: WO2022/023990
PCT Pub. Date: Feb. 3, 2022

(65) Prior Publication Data
US 2023/0303174 A1     Sep. 28, 2023

(30) Foreign Application Priority Data
Jul. 31, 2020    (FR) ...................................... 2008207

(51) Int. Cl.
*B62D 21/14*          (2006.01)
*B60B 35/14*          (2006.01)
(Continued)

(52) U.S. Cl.
CPC .............. *B62D 21/14* (2013.01); *B60B 35/14* (2013.01); *B62D 21/06* (2013.01); *B62D 7/142* (2013.01); *B66F 11/046* (2013.01)

(58) Field of Classification Search
CPC ......... B62D 21/14; B62D 7/142; B62D 21/06
See application file for complete search history.

(56) References Cited

U.S. PATENT DOCUMENTS 6,405,114 B1 *   6/2002   Priestley ............... B66F 11/046
                                                          701/50
7,198,278 B2     4/2007   Donaldson
(Continued)

FOREIGN PATENT DOCUMENTS

CN          106080833 A     11/2016
EP            2537684 A1     12/2012
(Continued)

*Primary Examiner* — Long T Tran
(74) *Attorney, Agent, or Firm* — 24IP Law Group USA, PLLC; Timothy DeWitt

(57)          ABSTRACT

An on-board electronics system of an aerial work platform moves the wheels between a retracted and extended position by pivoting a respective arm. The method comprises the following successive steps: a) orienting each wheel tangentially to the pivoting path of the corresponding arm, b) moving the wheel by pivotally actuating the corresponding arm, and c) reorienting the wheel so as to enable another translation of the aerial work platform. The steps are performed in different orders between the wheels so that at any time at least one of the following conditions is complied with: —the brake system of at least one wheel is active, —at least one wheel is rotated by a motorised drive, —the orientation of the wheels relative to one another prevents any translation of the aerial work platform (1) on the ground as a result of gravitational force.

20 Claims, 12 Drawing Sheets

(51) Int. Cl.
    *B62D 21/06*        (2006.01)
    *B62D 7/14*         (2006.01)
    *B66F 11/04*        (2006.01)

(56) References Cited

U.S. PATENT DOCUMENTS

| | | | |
|---|---|---|---|
| 8,888,122 B2 | 11/2014 | Berry | |
| 2015/0259185 A1* | 9/2015 | Ditty .................... | B66F 11/046 |
| | | | 182/19 |
| 2020/0317486 A1* | 10/2020 | Puszkiewicz ....... | B66F 9/07586 |
| 2020/0317493 A1* | 10/2020 | Lombardo ........... | B66F 11/044 |

FOREIGN PATENT DOCUMENTS

| | | | |
|---|---|---|---|
| FR | 1113811 A | 4/1956 | |
| GB | 767420 A | 2/1957 | |

* cited by examiner

METHOD FOR EXTENDING OR RETRACTING THE WHEELS OF AN AERIAL WORK PLATFORM MOUNTED ON PIVOTING ARMS

BACKGROUND OF THE INVENTION

Field of the Invention

The present invention relates to the field of mobile elevating work platforms (MEWP), also commonly known as aerial work platforms (AWP).

Brief Description of the Related Art

Aerial work platforms are machines designed to allow one or more people to work at height. For this, they include a working platform designed to accommodate one or more people. It is supported by a lifting mechanism that allows it to be raised from a lowered position on the chassis of the aerial work platform to the desired working position at height. Aerial work platforms may be movable on the ground, in which case they are equipped with wheels or tracks for this purpose. They are often self-propelled. i.e. motorized to allow their autonomous movement on the ground. The working platform is equipped with a control console fitted with control elements allowing an operator to operate the lifting mechanism and, if necessary, the movement of the aerial work platform on the ground.

The invention relates more particularly to aerial work platforms with four wheels. i.e. two front wheels and two rear wheels, which allow the aerial work platform to be moved on the ground and whose lateral spacing-commonly called the track—can be modified so as to be wider in the working position and narrower for transport or road travel.

A wide lateral wheel spacing provides increased stability to the aerial work platform when it is in the working position. i.e. when the working platform is raised by the lifting mechanism to a desired working height. However, a wide lateral wheel spacing may be incompatible with transporting the aerial work platform on a truck or moving it on the road because it generally exceeds the maximum limits for truck transport or road travel. The fact that the lateral wheel spacing can be changed to be wider in the working position and narrower for transport or road travel reconciles these two considerations. In the prior art, several technologies have been proposed to allow the lateral spacing of the wheels to be changed.

In a first technology, each of the wheels is mounted at one end of a respective telescopic arm, the opposite end of which is fixedly mounted to the chassis of the aerial work platform. The telescopic arms are actuated by cylinders to laterally translate the respective wheels with respect to the chassis of the aerial work platform, and thus to vary their lateral spacing.

This first technology has limitations in that the spacing between the front and rear wheels—commonly called the wheelbase—is limited by the size of the chassis. Moreover, changing the wheel spacing is tedious because the aerial work platform must be lifted off the ground by means of dedicated cylinder to free the wheels from the ground before changing their spacing. In addition, the ground support pads at the end of the cylinders can sink into the ground under the weight of the aerial work platform in the case of soft ground or a weak floor covering.

In a second technology known in the jargon as "X-axles", each of the wheels is mounted at one end of a respective arm, the opposite end of which is pivotally mounted to the chassis about a vertical axis so that the lateral spacing of the wheels can be varied. One or more cylinders make it possible to pivot the arms between the extended working position and the retracted transport position. This technology is illustrated in U.S. Pat. No. 7,198,278 B2, U.S. Pat. No. 8,888, 122 B2 and CN106080833A. Compared to the previous technology, this second technology allows to increase the wheelbase because the wheel support arms position the front and rear wheels at a spacing from the chassis of the aerial work platform in the forward and rearward direction respectively. This second technology therefore further increases the stability of the aerial work platform, and thus allows even greater lifting heights of the working platform.

A difficulty with this second technology also lies in the way in which the wheel support arms are pivoted in practice to change the wheel spacing. Different ways have been proposed.

A first way is similar to the one mentioned for the first technology: it consists in lifting the wheels from the ground by means of dedicated cylinders, before the wheel support arms are pivoted by the arm actuating cylinder(s). This first way has the same draw backs as those already mentioned for this first technology.

A variant consists, in the absence of driving the aerial work platform in translation on the ground as previously, in making the wheel support arms pivot, but without prior lifting of the wheels from the ground. In other words, the aerial work platform remains stationary in the same place on the ground while the wheel support arms are pivoted. In this case, the wheels, which are in their substantially parallel orientation to each other, rub against the ground when the wheel support arms are pivoted. This has the disadvantage of putting a lot of stress on the rubber of their tires and thus their faster wear, and also of risking damaging the ground surface or digging a furrow in it if it is a soft ground. In addition, the actuating cylinder(s) of the wheel support arms must be more powerful.

Another way of executing the pivoting of the wheel support arms is to execute it during a translational movement of the aerial work platform on the ground. This limits the stress on the tires and the ground compared to the previous case, but does not eliminate it. It has also been proposed to orient the front wheels, respectively the rear wheels, in an inclined manner so as to be convergent or divergent, depending on the case, in order to create forces on the wheels that promote the pivoting of the wheel support arms in the desired direction. As a result, the actuating cylinder(s) for the wheel support arms may be less powerful, or even be omitted according to U.S. Pat. No. 7,198,278 B2, nevertheless the stress on the tires and the ground is increased. In any case, this method assumes that there is enough room to move the aerial work platform on the ground over the distance required to pivot the wheel support arms, which may not always be the case. It also requires the operator of the aerial work platform to be more vigilant with regard to people who may be in the area where the aerial work platform is moving on the ground, for obvious safety reasons.

In view of these disadvantages, it is desirable to improve the way in which the wheel support arms are pivoted. An old document. FR 1 113 811, which has been ignored in practice in the field of aerial work platforms, contains teachings on how to achieve the pivoting of the wheel support arms. This document relates to a rolling chassis, with variable track gauge, for vehicles of all kinds, on roads, on land and on rails. In particular, it discloses a rolling chassis similar to the second technology mentioned above, i.e., with four wheels—or the like-mounted at one end of a respective arm, the opposite end of which is pivotally mounted to the chassis so that the lateral spacing of the wheels can be varied.

As to how to pivot the wheel support arms, it proposes, among other possibilities, to do so while the rolling chassis is stationary and by positioning the wheels tangentially to the pivoting circle of the wheel support arms, and then to simultaneously pivot all four wheel support arms by operating the wheels or, alternatively, by actuating the wheel support arms manually or mechanically. Once the new wheel spacing is reached, the orientation of the wheels is changed again to restore parallelism between them and allow the rolling chassis to move on the ground under normal conditions.

This method avoids the need for translation of the chassis on the ground during the pivoting of the wheel support arms, and thus the associated disadvantages, and also avoids significant stress on the tire rubber and the ground due to the tangential orientation of the wheels during the pivoting of the wheel support arms.

However, the described extension method requires the intervention of the operator during the different phases of the extension of the wheels. Moreover, this way of proceeding has the disadvantage that during the operations of extension or retraction of the wheels, the chassis risks to translate on the ground under the effect of gravity if it rests on an inclined ground, which is not desirable. Indeed, there may be certain phases of the wheel extension or retraction operations during which the wheels are all freewheeling with an orientation compatible with a translation of the aerial work platform on the ground.

SUMMARY OF THE INVENTION

According to one aspect, the aim of the present invention is to provide for the so-called X-axle technology a method intended to be implemented by on-board electronics of the aerial work platform and at least partially alleviating the aforementioned drawbacks. In particular, one aim of the method of the invention is to avoid any risk of accidental translation of the aerial work platform on the ground under the effect of gravity during its execution.

To this end, the present invention proposes a method implemented by on-board electronics of an aerial work platform for moving a pair of front wheels and a pair of rear wheels of the aerial work platform between an initial position and an end position, one of which corresponds to a retracted position and the other to an extended position, the aerial work platform resting on the ground via the wheels with a spacing between the pair of front wheels and a spacing between the pair of rear wheels that is greater in the extended position than in the retracted position, the aerial work platform comprising a chassis and four arms each supporting a respective one of the wheels, each of the wheels being mounted at a first end of the corresponding arm, a second distal end of which is pivotally mounted to the chassis to move the wheel between the retracted position and the extended position along a pivoting path of the arm, each of the wheels having a ground rolling direction modifiable by a controlled change of orientation of the wheel with respect to the corresponding arm, the method comprising for each wheel the following successive steps:

a. changing the orientation of the wheel with respect to the corresponding arm to have an orientation tangential to the pivoting path of the corresponding arm.

b. moving the wheel from the initial position to the end position by pivoting the corresponding arm, a possible braking system for the wheel being inactive during the movement and the wheel being kept oriented tangentially to the pivoting path of the arm during the movement, and optionally c. controlling a change in orientation of the wheel with respect to the corresponding arm so that, after execution of step c) for all wheels, the wheels all have a rolling direction that corresponds to a common direction of travel of the aerial work platform on the ground, wherein the execution of steps a), b) and if applicable c) for all the wheels is desynchronized so that, at any time from the beginning of step a) until the end of step b) or if applicable step c) for all the wheels, at least one of the following conditions is satisfied:

the brake system of at least one wheel is active, at least one wheel is subject to a motorized rotation drive, the relative orientation of the wheels with respect to each other prevents any translation of the aerial work platform on the ground under the effect of gravity, it being understood that this last condition is of course assessed for an inclination of the ground on which the aerial work platform rests which is less than or equal to a maximum authorized inclination to carry out the operation of extension or retraction of the wheels.

Thanks to the desynchronization as defined, any risk of accidental translation of the aerial work platform on the ground under the effect of gravity during the execution of the method is excluded in the case where the aerial work platform rests on an inclined ground, at least in the case where the inclination of the ground is not higher than the maximum admissible inclination for using the aerial work platform. For simplicity, the arms supporting the wheels are preferably each made in a rigid one-piece form.

According to preferred embodiments, the invention comprises one or more of the following features:

the execution of steps a), b) and if applicable c) for all the wheels is desynchronized so that, at any time from the beginning of step a) until the end of step b) or if applicable c), at least one of the following conditions is satisfied:

the brake system of at least two wheels is active, at least two wheels are subject to a motorized rotation drive, the relative orientation of the wheels with respect to each other prevents any translation of the aerial work platform on the ground under the effect of gravity:

step a) is initiated for each of the wheels before the execution of step b) is completed for any of the other wheels;

the execution of step b) for each of the wheels at least partially overlaps in time with the execution of step b) for the other wheels;

step b) is initiated synchronously for a first pair of wheels, step b) is initiated synchronously for a second pair of wheels, the second pair of wheels being formed by the wheels other than the two wheels forming the first pair of wheels, and step b) is initiated for the second pair of wheels with a time shift with respect to the first pair of wheels;

step b) is executed synchronously for the first pair of wheels, and step b) is executed synchronously for the second pair of wheels;

the pivoting actuation of the arm during step b) is performed: by means of an actuator dedicated to the actuation of one or more arms, and/or by motorized rotation of the wheel corresponding to the arm;

the actuation for pivoting the arm in step b) for at least one of the wheels comprises or consists of a motorized rotation drive of the wheel for a wheel, a change in ground rolling direction with respect to the corresponding arm is effected by pivoting the wheel with respect to a pivot axis which is offset with respect to a median plane of the wheel perpendicular to the axis of rotation of this wheel, and the change of orientation of the wheel with respect to the corresponding arm in step a) and/or in step c) is obtained or assisted by a motorized rotation drive of the wheel;

the method is executed by the on-board electronics upon actuation of at least one control by an operator, wherein the execution of the method is continued by the on-board electronics up to an end position of the wheels corresponding to an extreme retracted or extended position as long as the actuation of the control is maintained by the operator and is interrupted by the on-board electronics if the control is released by the operator before the extreme retracted or extended position of the wheels has been reached: in the latter case, the on-board electronics may also prevent the lifting of a working platform of the aerial work platform if the wheels are not all in the extreme extended position: preferably, in the latter case, if the execution of the method is interrupted by the on-board electronics due to the operator releasing the control and the wheels are not all in the extreme extended position, then the on-board electronics switches on a signaling informing the operator that the lifting of the working platform is prevented;

the method is executed by the on-board electronics upon actuation of at least one control by an operator, wherein the execution of the method is continued by the on-board electronics up to an end position of the wheels corresponding to an extreme retracted or extended position as long as the actuation of the control is maintained by the operator and if the control is released by the operator during the execution of step b) for each of the wheels before the extreme retracted or extended position of the wheels has been reached, the on-board electronics continue the execution of the method up to a modified end position of the wheels which is intermediate between the extreme retracted position and the extreme extended position: preferably, if the on-board electronics continues the execution of the method up to a modified end position of the wheels that is intermediate between the extreme retracted position and the extreme extended position, then the on-board electronics further prevent the lifting of a working platform of the aerial work platform or limit a maximum height to which the operator can lift the working platform with respect to the case when the wheels are all in the extreme extended position.

The invention also proposes an aerial work platform comprising:

a chassis, a working platform, a lifting structure mounted on the chassis and supporting the working platform for lifting it to height, a pair of front wheels and a pair of rear wheels movable between a retracted position and an extended position, the aerial work platform resting on the ground via the wheels with a spacing between the pair of front wheels and a spacing between the pair of rear wheels that are greater in the extended position than in the retracted position, on-board electronics, four arms each supporting a respective one of the wheels, each of the wheels being mounted at a first end of the corresponding arm, a second distal end of which is pivotally mounted to the chassis to move the wheel between the retracted position and the extended position along a pivoting path of the arm, each of the wheels having a ground rolling direction modifiable by a change of orientation of the wheel with respect to the corresponding arm, the on-board electronics being provided to control a change of orientation of the wheel with respect to the corresponding arm, a braking system for at least two of the wheels which is provided to be controlled by the on-board electronics, wherein for each of the wheels it is provided that the wheel is driven, the motorized rotation drive of the wheel being controllable by the on-board electronics, and/or that the associated arm can be actuated to pivot by an actuating device of the aerial work platform, and wherein the on-board electronics is configured to carry out the method according to the invention.

According to a preferred embodiment, the aerial work platform further comprises one or more manual control members preferably arranged on a control console mounted on the working platform, the on-board electronics being provided to carry out any one of the preferred features of the method relating to the actuation of a control by the operator in relation to the actuation of the manual control member or at least one of the manual control members.

In the latter case, the manual control member(s) comprise(s) or consist(s) of at least one switch prestressed to a rest position, and more preferably comprise(s) or consist(s) of:

at least one reversing switch which is prestressed towards a central rest position, the on-board electronics being arranged to cause the wheels to move to the extended position only if the switch is actuated in a given direction and to cause the wheels to move towards the retracted position only if the switch is actuated in an opposite direction; and/or at least two switches each prestressed towards a rest position, the on-board electronics being arranged to cause the wheels to move towards the extended position only if one of the switches is actuated and to cause the wheels to move towards the retracted position only if the other switch is actuated.

According to another aspect, the invention also aims at proposing an aerial work platform according to the so-called "X-axle" technology provided with actuators dedicated to the pivoting of the wheel support arms, which are protected against impacts with possible external obstacles.

To this end, the invention proposes an aerial work platform provided with a pair of front wheels and a pair of rear wheels which are movable between a retracted position and an extended position, the aerial work platform resting on the ground via the wheels with a spacing of the pair of front wheels and a spacing of the pair of rear wheels which are greater in the extended position than in the retracted position, the aerial work platform comprising a chassis and four arms each supporting a respective one of the wheels, each of the wheels being mounted at a first end of the corresponding arm, a second distal end of which is pivotally mounted to the chassis to move the wheel between the retracted position and the extended position, the aerial work platform further comprising for at least one of the arms, preferably for all of the arms, a dedicated actuator for pivoting the arm between the retracted position and the extended position, the dedicated actuator being set back in the horizontal direction with respect to an extension of the chassis at least in the case when the corresponding arm is in the extended position. In this way, the actuator is protected against the risk of impact with possible obstacles external to the aerial work platform during its translation on the ground in the direction corresponding to the side of the chassis on which the actuator is arranged. In fact, it is the chassis that will absorb the impact with a possible obstacle without the latter coming into contact with the actuator.

According to preferred embodiments, the invention according to this aspect comprises one or more of the following features:

the actuator is a cylinder mounted between the chassis and the corresponding arm;

the actuator is mounted on the chassis at a point on the chassis located, in the lateral direction, either between the pivot axes of the two arms supporting the front wheels in the case where the actuator is mounted to an arm supporting a front wheel, or between the pivot axes of the two arms supporting the rear wheels in the case where the actuator is mounted to an arm supporting a rear wheel;

such an actuator or cylinder is provided for the two arms supporting the front wheels and/or for the two arms supporting the rear wheels;

the chassis extension is located at a level below the actuator or cylinder;

the chassis extension is made integrally of material with a chassis base plate, preferably a lower chassis base plate;

each of the wheels has a ground rolling direction modifiable by a controlled change in orientation of the wheel with respect to the corresponding arm.

Further aspects, features and advantages of the invention will become apparent from the following description of a preferred embodiment of the invention, given by way of example and with reference to the attached drawing of a four-wheeled aerial work platform movable from a retracted position to an extended position and vice versa.

DETAILED DESCRIPTION OF THE INVENTION

Figure 1:
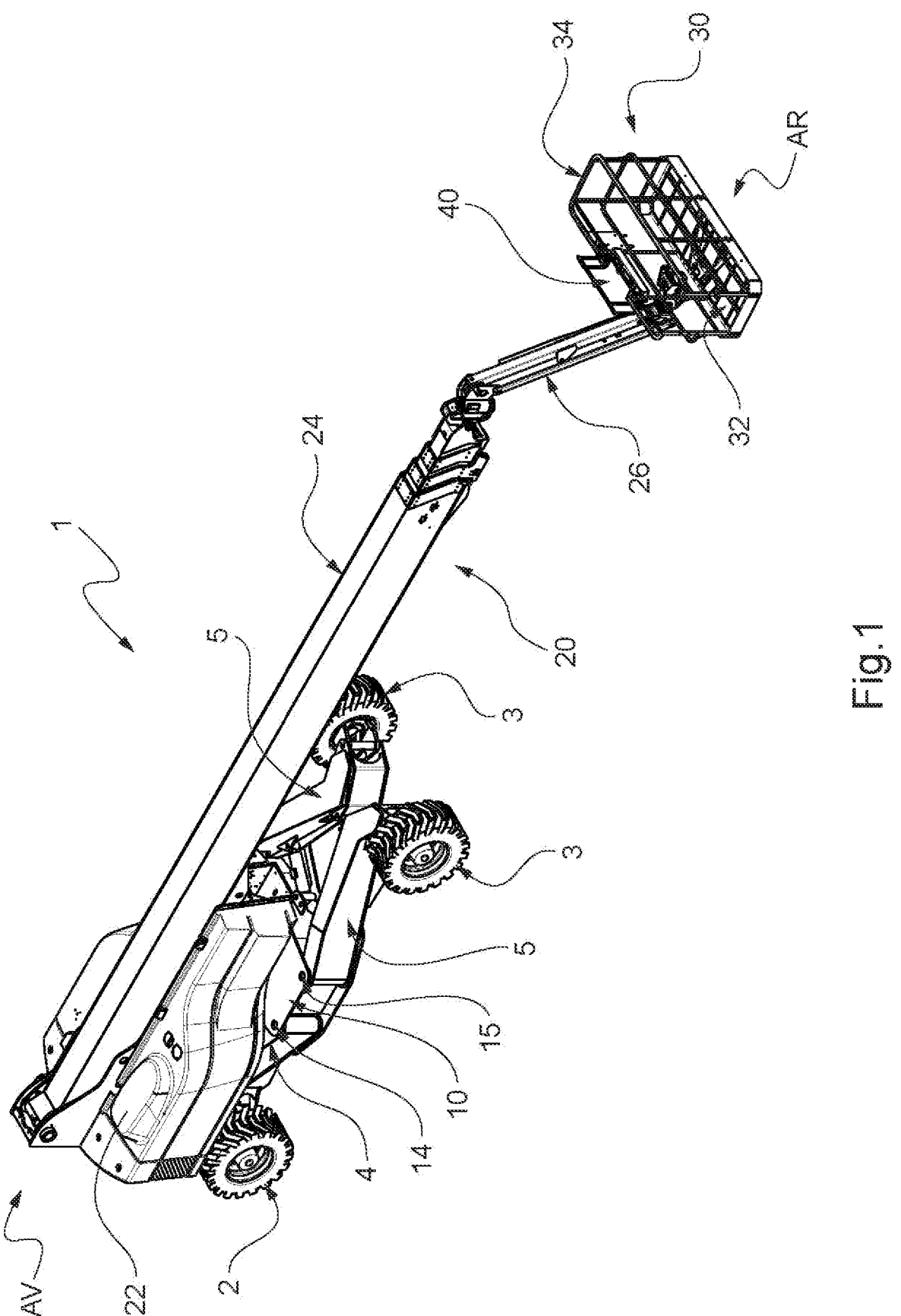
FIG. 1 shows a perspective view of the aerial work platform with its four wheels in retracted position.
Figure 2:
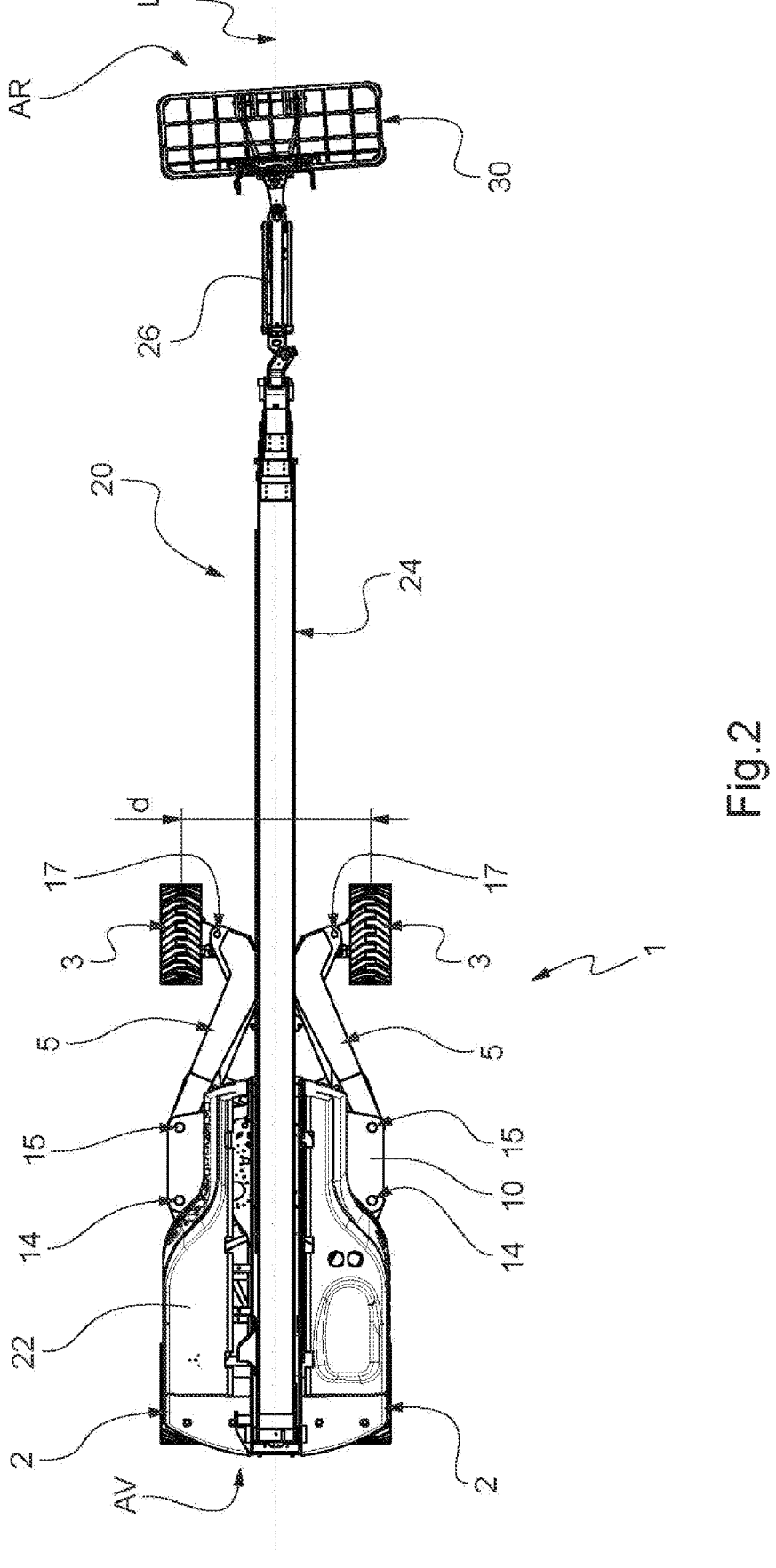
FIG. 2 shows a top view of the aerial work platform with its four wheels in the retracted position.

An example of the implementation of the method according to the invention will now be detailed with reference to an aerial work platform 1, an overall view of which is illustrated by FIGS. 1 and 2 on the one hand and FIGS. 3 and 4 on the other. In the following description, any reference to a vertical or horizontal orientation is defined with respect to the case where the aerial work platform 1 rests on a ground forming a horizontal reference plane.

The aerial work platform 1 comprises a chassis 10 and a lifting structure 20 supporting a working platform 30 provided to receive on board personnel and equipment in order to perform work at height. The platform 10 typically comprises a floor 32 and a guardrail 34. A control console 40 is arranged on the working platform 30. It allows an operator on board the working platform 30 to control the lifting structure 20 to move the working platform 30 up to the desired position, as well as to move the chassis 10 on the ground.

The lifting structure 20 includes a turret 22 mounted to the chassis 10 and a telescopic boom 24 pivotally mounted to the turret 22 about a horizontal axis. The turret 22 is pivotally mounted about a vertical axis on the chassis 10, which allows to change the orientation of the lifting structure 20 and thus the orientation of the working platform 30 with respect to the chassis 10. To allow the working platform 30 to be moved locally without acting on the boom 24, the lifting structure 20 also includes a pendulum arm 26 hingedly mounted at one end to the upper end of the telescopic boom 24 while the other end of the pendulum arm 26 hingedly supports the working platform 30. It will be understood that the lifting structure 20 may be different from that described. For example, it may additionally comprise a pantographic articulated arm which is mounted by one end on the turret 22 about a horizontal axis and which supports at its other end the telescopic boom 24 also about a horizontal axis, the articulated arm being provided to be able to unfold in height. Alternatively, the pendulum arm 26 may be omitted. The lifting structure 20 typically includes a set of actuators to produce the various movements of the lifting structure 20, for example a hydraulic motor to rotate the turret 22 and a set of hydraulic cylinders for the extension of the telescopic boom 24, the local displacement of the pendulum arm 26, as well as of the working platform 30.

The chassis 10 is equipped with two front wheels 2 and two rear wheels 3 provided to come into contact with the ground: the front side, respectively rear side, of the aerial work platform 1 is indicated by the arrow referred to as AV, respectively AR. In use, the aerial work platform 1 rests on the ground by means of the wheels 2, 3 which allow the translation of the aerial work platform on the ground.

Figure 5:
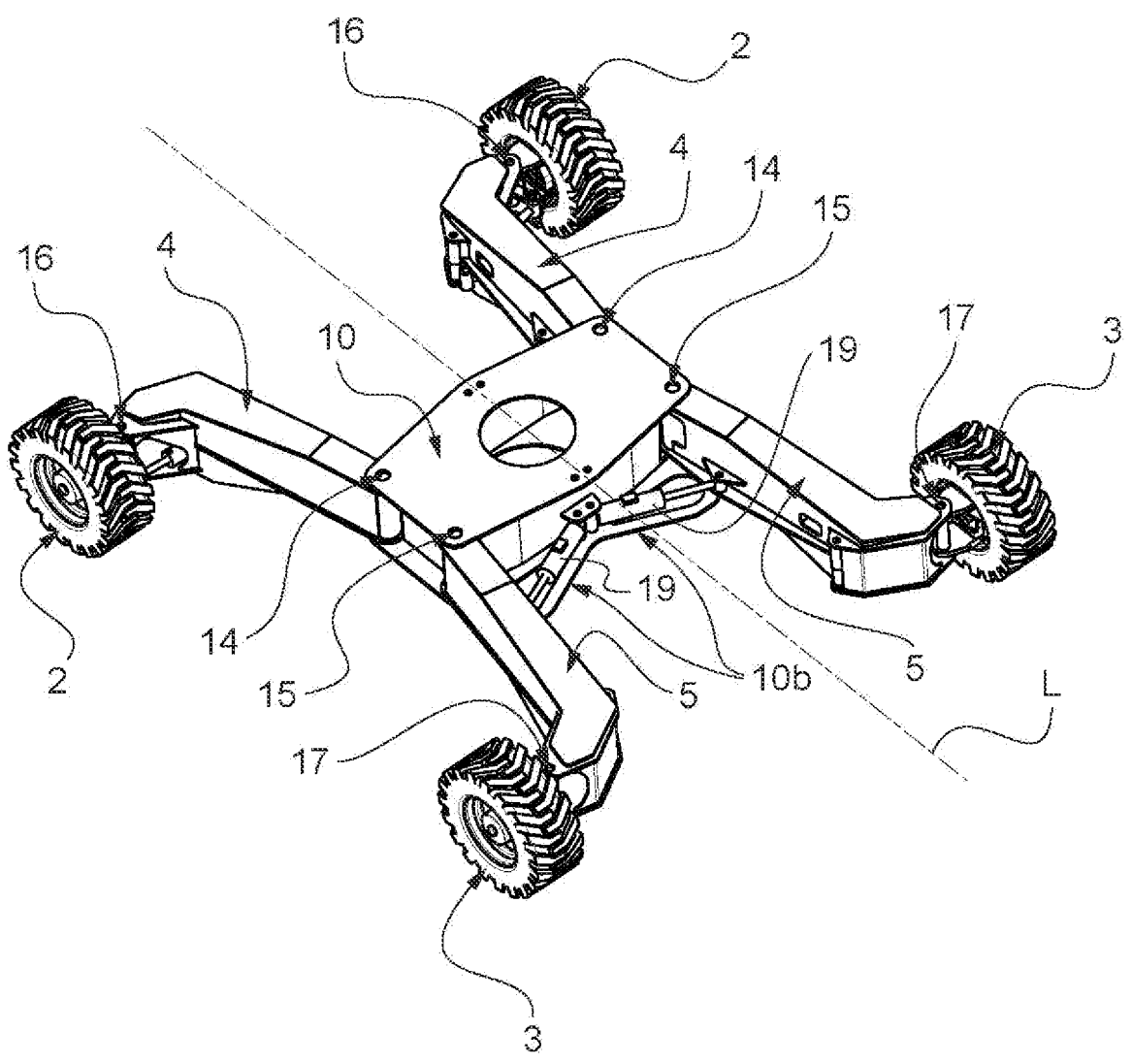
FIG. 5 shows a perspective view of the chassis of the aerial work platform viewed above the chassis with the wheels in the extended position.
Figure 6:
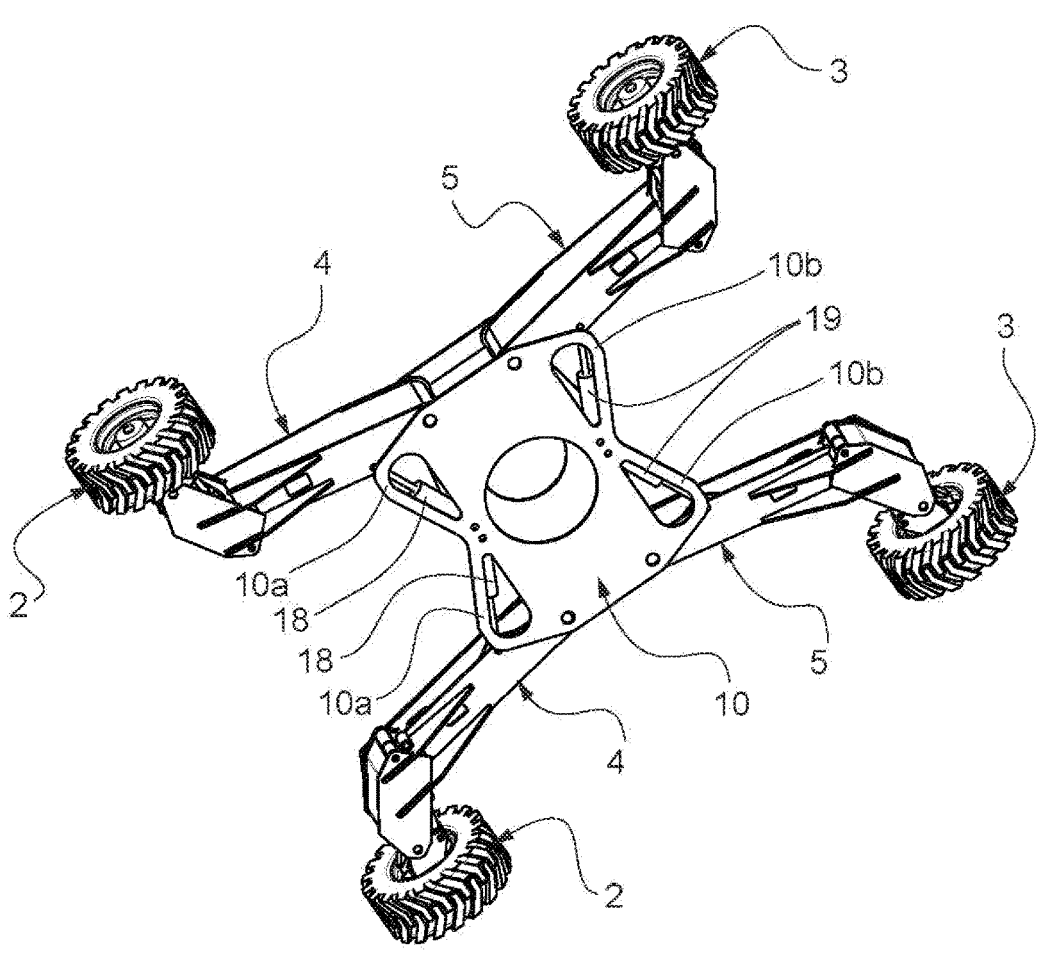
FIG. 6 shows a perspective view of the chassis of the aerial work platform viewed from a point below the chassis with the wheels in the extended position.

The wheels 2, 3 are each supported by a respective arm referenced 4 for each of the front wheels 2 and 5 for each of the rear wheels 3. More particularly, each of the wheels 2, 3 is mounted at one end of the corresponding arm 4 or 5 while a second distal end of the arm is pivotally mounted to the chassis 10. As best seen in FIGS. 5 and 6, the arms 4 and 5 preferably have the same length and are arranged symmetrically with respect to the longitudinal vertical median plane L of the aerial work platform 1. The normal direction of translation of the aerial work platform 1 forwards and backwards coincides, in top view, with the plane L. Alternatively, the arms 5 can have a different length than the arms 4.

Figure 3:
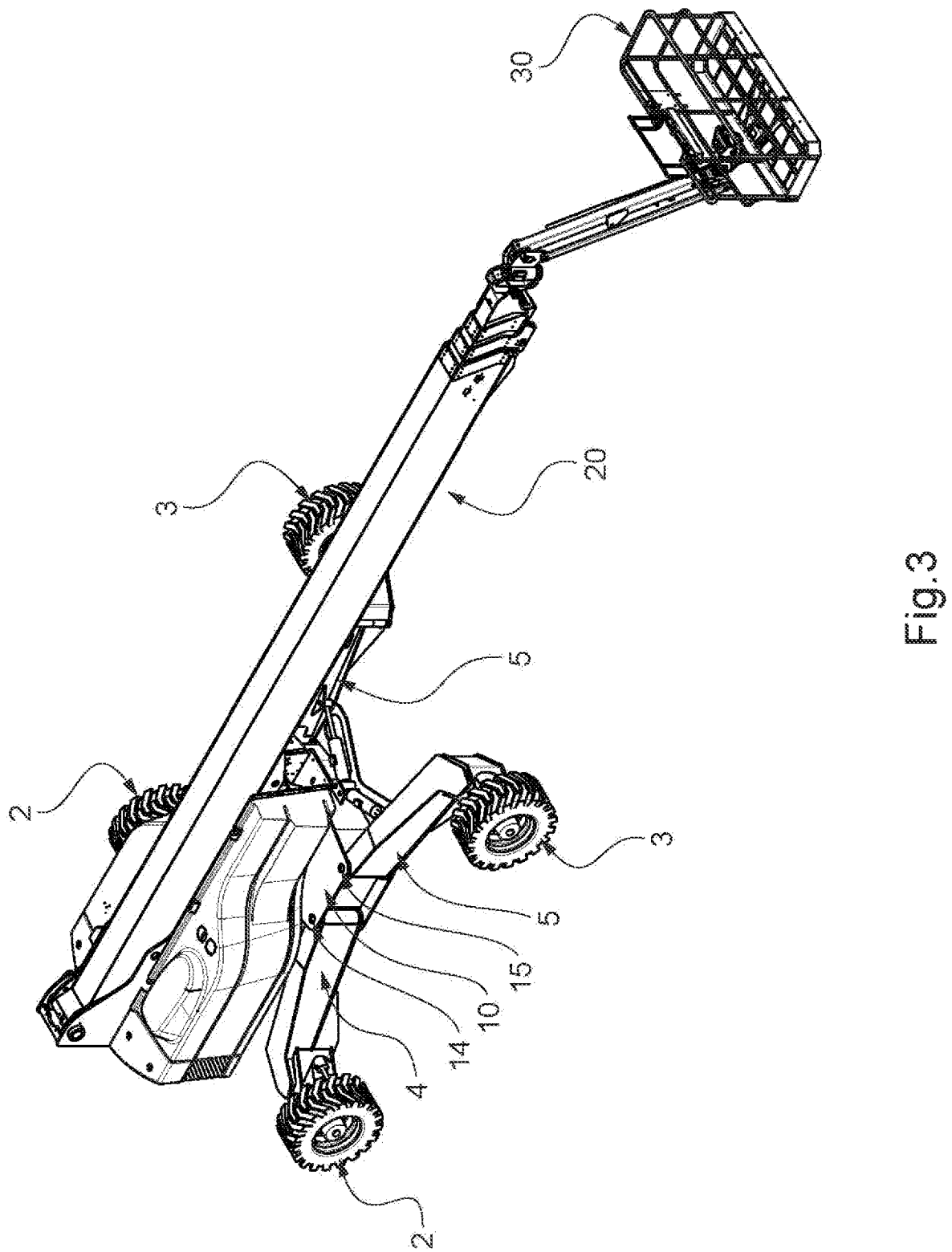
FIG. 3 represents a perspective view of the aerial work platform with its four wheels in extended position.
Figure 4:
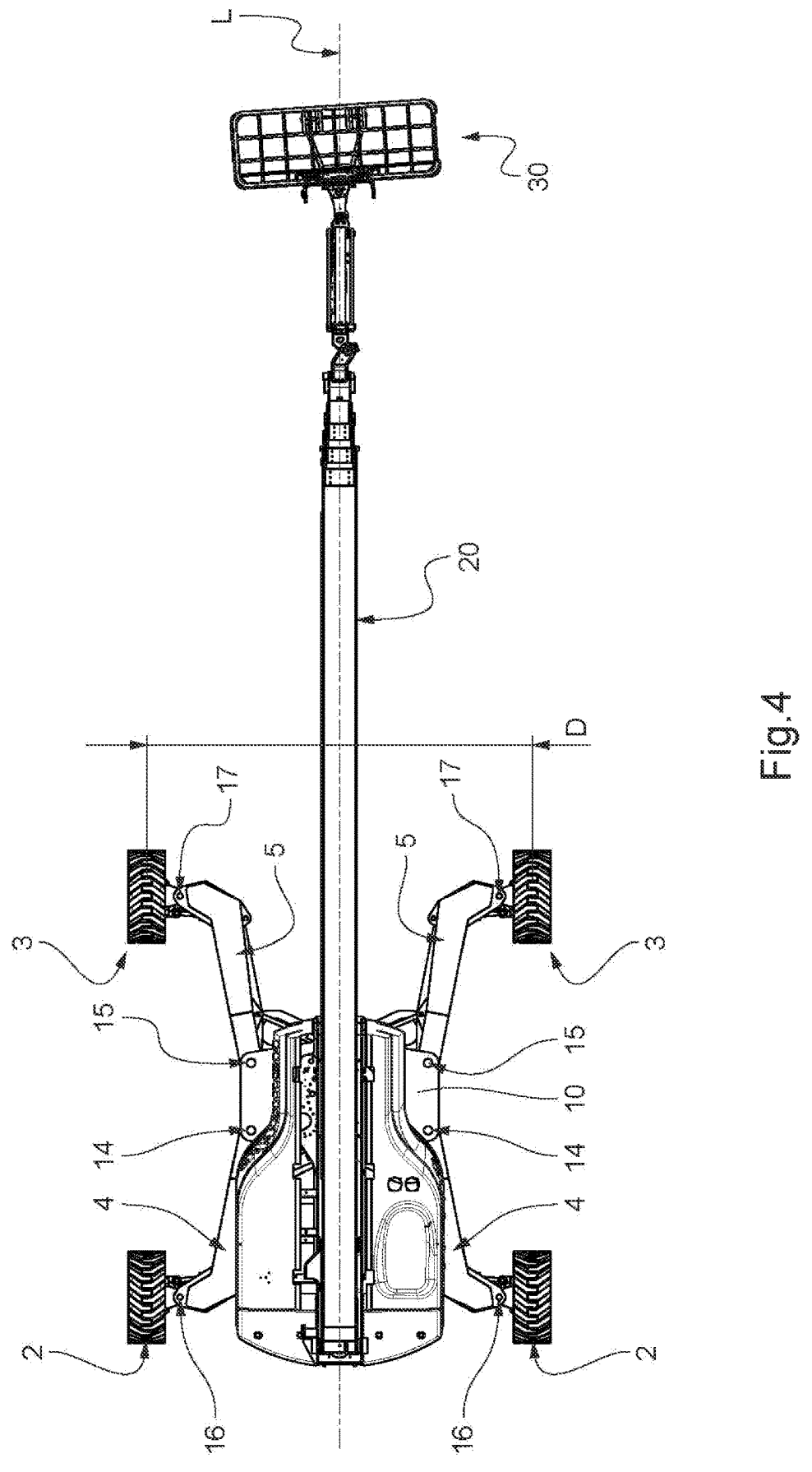
FIG. 4 shows a top view of the aerial work platform with its four wheels in the extended position.

The pivoting of each arm 4, 5 with respect to the chassis 10 allows the corresponding wheel 2 or 3 to be moved between a retracted position illustrated by FIGS. 1 and 2 and an extended position illustrated by FIGS. 3 and 4. For this purpose, the pivot axis 14, respectively 15 of each arm 4, respectively 5, with respect to the chassis 10 is vertical—or at least has an inclination with a vertical component—so as to move the corresponding wheel between the retracted position and the extended position.

As can be seen in FIGS. 2 and 4, the horizontal spacing 'D' between the rear wheels 3 in the extended position is greater than their horizontal spacing 'd' in the retracted position. The same applies to the horizontal spacing—not shown in the figures—between the front wheels 2. In both the retracted and the extended position, the horizontal spacing between the front wheels 2 is preferably the same as the horizontal spacing 'd' or 'D' between the rear wheels 3. Alternatively, however, the spacing may be different.

In the retracted position of the wheels 2, 3, their spacing 'd' is preferably less than or equal to 2.5 m, which makes the aerial work platform 1 suitable for driving on roads of standard width or for loading on a trailer for transport on such roads. The retracted position of the wheels 2, 3 thus corresponds to a transport or road travel configuration of the aerial work platform 1.

The extended position of the wheels 2, 3 is, on the contrary, a working configuration of the aerial work platform 1 intended for lifting the lifting structure 20 in order to position the working platform 30 at a desired working height. In this position, the spacing 'D' between the wheels 2 and between the wheels 3 is preferably greater than 3 m, or even greater than or equal to 4 m, or even up to 5 m. In the extended position, the wheelbase, i.e. the spacing between the front wheels 2 and the rear wheels 3 is preferably substantially equal to the spacing 'D'. The relative positioning of the wheels 2, 3 in the extended position provides the aerial work platform 1 with significantly more stability than in the retracted position. This makes it possible for the aerial work platform 1 to lift the working platform 30 to great heights, for example more than 40 m, which would not be possible in the retracted transport position.

The retracted and extended positions of the arms 4 and 5 preferably correspond to the extreme pivoting positions in which the wheels 2, respectively 3, are closest to each other for the former and farthest from each other for the latter. However, the aerial work platform 1 may also be provided for use with the wheels 2, 3 only partially extended, i.e. the arms 4, 5 are then placed in an intermediate pivoting position between the two extreme pivoting positions.

Arm actuators are provided to pivot each of the arms 4, 5 between the retracted and extended positions. In this case, as best seen in FIGS. 5 and 6, each arm 4, 5 can be actuated by a corresponding cylinder 18, respectively 19, arranged between the chassis 10 and the corresponding arm. Alternatively, it can be envisaged to use a common actuator for two arms, for example a common cylinder for the front arms 4 and another one for the rear arms 5. In the latter case, the cylinder can be mounted between the two corresponding arms by a respective end. Alternatively, the cylinder can be mounted by one end to the chassis 10 and by its opposite end to an articulated mechanism connecting the two corresponding arms so that the cylinder actuates the two arms to pivot by means of the articulated mechanism. In another variant, the pivoting actuation of the arms 4, 5 can also be carried out by the rotation drive of the corresponding wheels when the wheels are driven as we will see later. In this case, the dedicated actuator—i.e. in this example the corresponding cylinder 18 or 19—may act in coordination with the rotation drive of the wheels or it may be omitted. These different variants can be mixed: for example, the actuation technology can be different for a first pair of arms compared to a second pair of arms.

Preferably, the cylinders 18 and 19 are protected from possible impacts against obstacles outside the aerial work platform 1 during its movement on the ground. As illustrated by FIGS. 5 and 6, this protection may be obtained by a front extension 10a and a rear extension 10b of the chassis 10 with respect to which the cylinders 18, respectively 19, are set back in the front direction, respectively rear direction, whatever the angular position of the corresponding arm 4 or 5 between the retracted position and the extended position. Thus, it is the chassis 10 that will absorb the impact with a possible obstacle without the latter coming into contact with the cylinder(s) 18 or 19. It is preferable that the front extension 10a and the rear extension 10b be located at a level below the cylinders 18, respectively 19, in order to effectively protect the cylinders 18, 19 against an obstacle on the ground extending substantially at the same height level as the cylinders 18, 19. The extensions 10a and 10b may be made integrally of material with a base plate of the chassis 10, in particular with a lower base plate of the chassis 10 as illustrated by FIGS. 5 and 6.

A locking system is provided for each arm 4 and 5 to selectively block their pivoting relative to the chassis 10 in the extreme pivoting positions, i.e., in the retracted position and in the extended position, or even in intermediate pivoting positions. One way of ensuring the locking is to block the pivoting of an arm 4 or 5 by hydraulic blocking of the corresponding cylinder 18 or 19, for example by providing two controlled valves associated with the cylinder to selectively block the hydraulic fluid in the two chambers of the corresponding cylinder 18 or 19 implemented as a double-acting hydraulic cylinder. This way is simple to implement and allows a blocking of the arms 4, 5 in any intermediate pivoting position.

Other locking systems are possible. For example, the locking system may consist in permanently actuating the corresponding cylinder 18 or 19 both in the retracted and in the extended position in order to constantly push the arm 4 or 5 against a dedicated stop of the chassis 10. According to another example, a dedicated electromechanical or hydraulic device may be provided to selectively mechanically secure the arm 4 or 5 with respect to the chassis 10 in the desired pivoting positions, for example a device provided directly at the pivot axes 14, 15 so as to prevent rotation of the arms or a pin mechanism linked to one to selectively engage dedicated openings that are associated with the other.

The aerial work platform 1 is motorized to allow its autonomous movement on the ground. In this case, each of the wheels 2, 3 is motorized. Although it may be different, it is preferable that an electric or hydraulic motor—not shown—is integrated in each driving wheel 2 and/or 3, which avoids implementing a complex chain of motion transmission from the chassis 10 if the motor(s) were installed on the chassis 10 or on the corresponding arm 4 or 5. Alternatively, only the front wheels 2 are driven or, on the contrary, only the rear wheels 3 are driven.

Each of the wheels 2, 3 is equipped with a braking system—not shown—which may be of any suitable type known per se, for example a hydraulic or solenoid valve braking system. Alternatively, only certain wheels are equipped with such a system, for example the pair of front wheels 2 or the pair of rear wheels 3. In this case, the references to the active or inactive state of the brake system will be ignored for the wheel(s) concerned in the description that will be made later of the method of extension of the wheels 2, 3. The active state of the brake system can then be replaced, if necessary, by placing at least two of the wheels in a mutually different orientation providing the same effect of holding the aerial work platform 1 in place on the ground.

Each of the wheels 2, 3 is directional. For this purpose, the front wheels 2 are each pivotally mounted to the corresponding arm 4 about a vertical axis 16 or at least which has a vertical component inclination. The same applies to the rear wheels 3 with respect to the corresponding arm 5: see the referenced pivot axis 17. The change in the direction of rolling on the ground of each wheel 2, 3, i.e. the change in their orientation with respect to the corresponding arm 4 or 5, is ensured by a respective steering actuator, in this case a cylinder mounted between the arm and the relevant wheel. This can be a hydraulic or electric cylinder. Other actuating technologies are also possible.

The aerial work platform 1 includes on-board electronics that control the motorization of the driving wheels 2 and/or 3, the actuators of the arms 4 and/or 5, the locking systems for the pivoting of the arms 4, 5, the steering actuators of the wheels 2, 3 and the braking systems of the wheels 2 and/or 3.

Furthermore, the aerial work platform 1 comprises sensors known per se to indicate to the on-board electronics the angular orientation of the wheels 2, 3 with respect to the corresponding arm 4, 5, as well as the pivoting position of the arms 4, 5 with respect to the chassis 10. By way of non-limiting examples, it may be one of the following sensor technologies:

- linear measurement of the rod extension of the cylinders by Hall effect sensor or magnetostrictive sensor placed in the cylinder concerned,
- measurement of the angle on the pivot of the arm or the steering pivot by a Hall effect sensor positioned on the concerned pivot,
- on/off measurement in the extreme pivot positions of the arms 4, 5 by a mechanical sensor or an ILS sensor for example.

Figure 16:
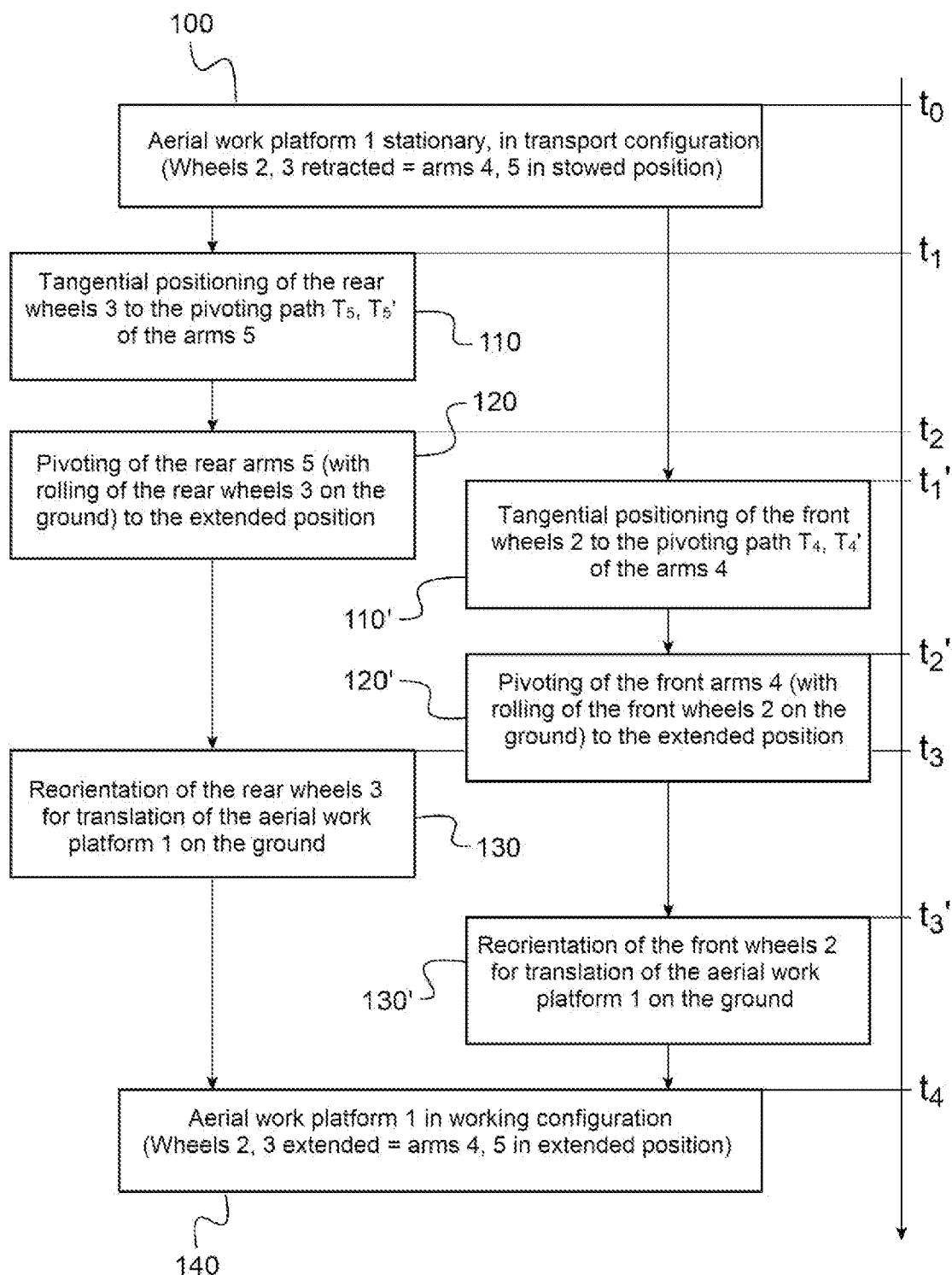
FIG. 16 represents a flow chart of a preferred embodiment of the method of the invention.

We will now describe the method for moving the wheels 2, 3 from their retracted position to their extended position with reference to the flowchart in FIG. 16. It will be understood that this flowchart only indicates the beginning of the method steps in relation to each other, but not the end of the steps in relation to each other.

The retracted and extended positions of the wheels 2, 3 correspond to the extreme pivoting positions of the arms 4, 5, but they could also be intermediate pivoting positions. FIGS. 8 to 15 illustrate the chassis 10 and the configuration of the arms 4, 5 and wheels 2, 3 at different steps of the method. It is carried out automatically by the on-board electronics of the aerial work platform 1 after a corresponding command is activated by an operator. It is understood that all actions of the method described below are controlled by the on-board electronics, even if there is no explicit mention of this.

Figure 7:
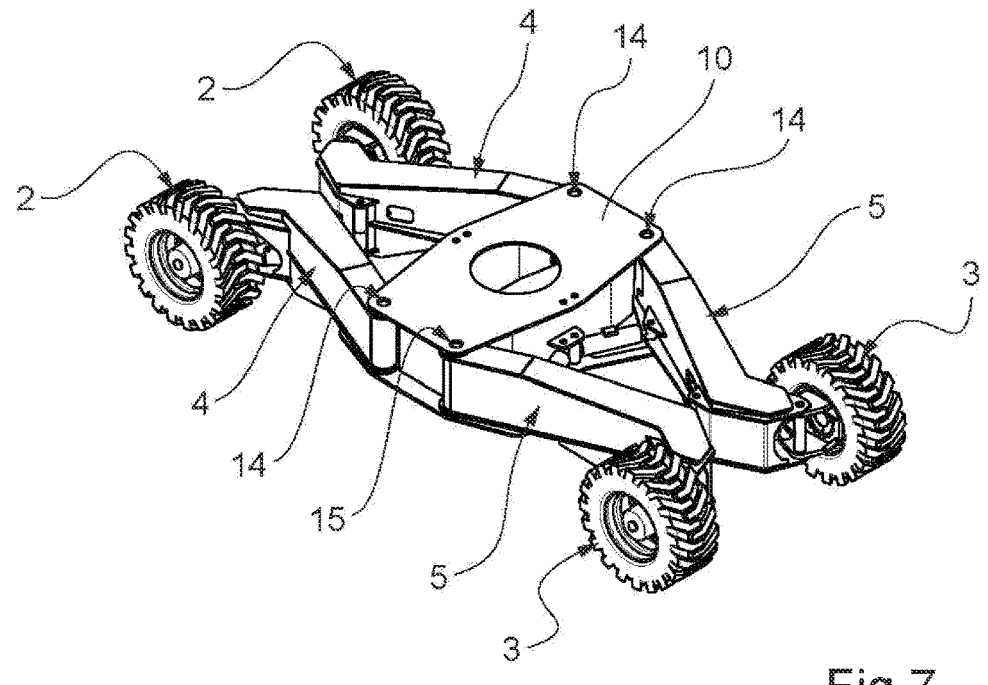
FIG. 7 shows a perspective view of the aerial work platform chassis with the wheels in the retracted position corresponding to an initial position from which the wheels will be moved to the extended position.
Figures 8, 9, 10:
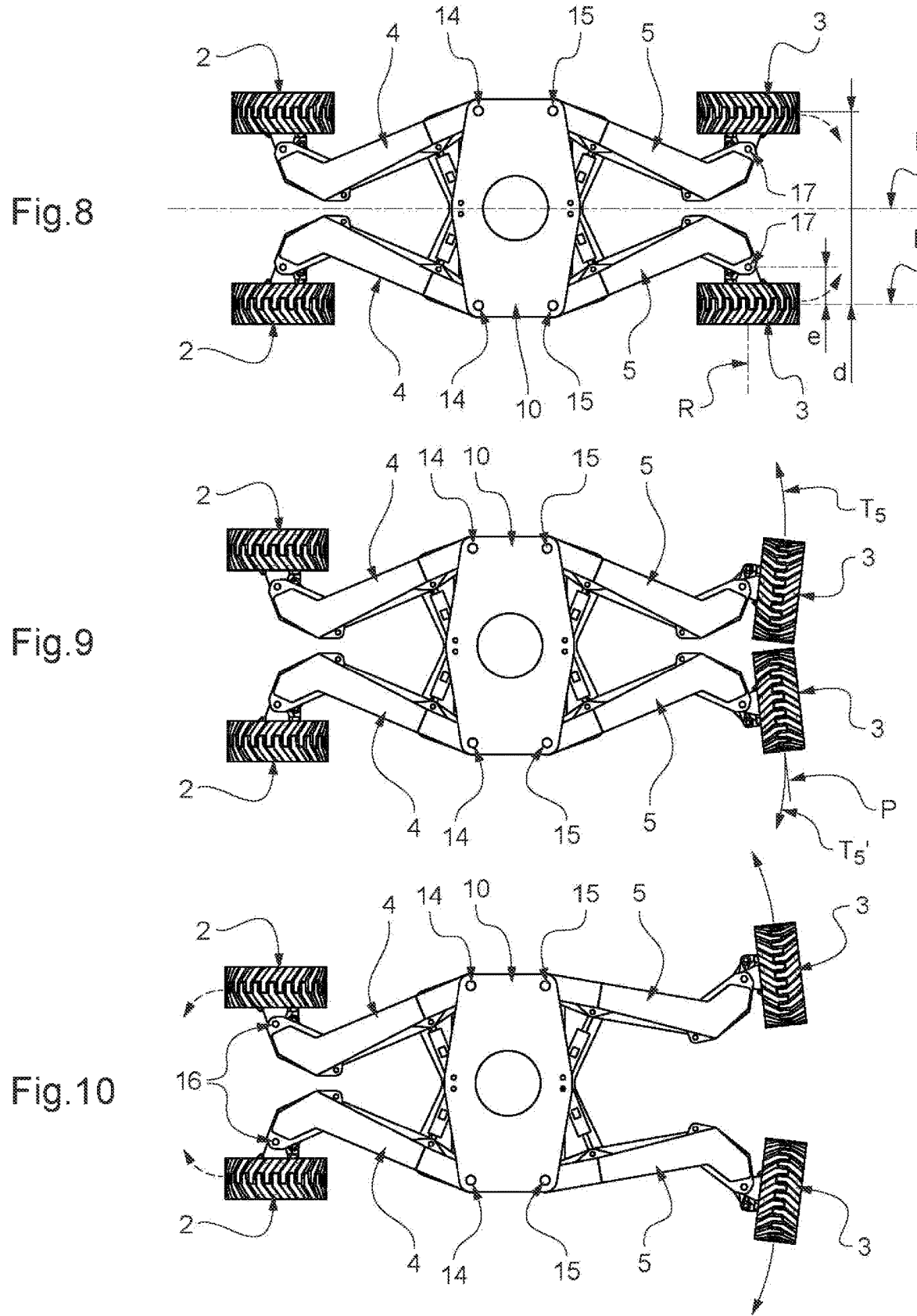
FIG. 8 represents a top view of the chassis, with the wheels in the configuration of FIG. 7.
FIG. 9 represents a top view of the chassis, the wheels and their support arms being in a position at a given time of the wheel extension method.
FIG. 10 represents a top view of the chassis, the wheels and their support arms being in a position at a time of the wheel extension method that is later than that of FIG. 9.

The method is carried out from an initial configuration of the aerial work platform 1 represented in FIGS. 7 and 8. It is identified by the box 100 of the flowchart of FIG. 16 and corresponds to a time to on the time axis. In this configuration, the aerial work platform 1 is immobilized and in transport configuration. In other words, the braking systems of the wheels 2 and/or 3 are activated and the wheels 2, 3 are in retracted position. The locking systems for the pivoting of the arms are activated. The wheels 2, 3 are oriented parallel to each other along the longitudinal axis L of the aerial work platform 1. In other words, the wheels 2, 3 have a common rolling direction which allows a straight translation of the aerial work platform 1 on the ground in the forward AV or rearward AR direction.

In case the wheels 2, 3 have a different initial orientation, the method may include a prior step in which the on-board electronics control the steering actuators of the relevant wheels 2 and/or 3 so as to orient them as mentioned above. Alternatively, the subsequent step may also be executed directly from any orientation of the wheels 2 and/or 3.

We will first describe the steps related to the extension of the rear wheels 3.

In a first step 110 that starts at time $t_1$, the on-board electronics control the steering actuators of the rear wheels 3 so that they adopt an orientation tangential to the pivoting trajectory $T_5$, $T_5'$ of the corresponding arm 5 around its pivoting axis 15. In other words, the rolling direction of each of the wheels 3 is made tangential to the pivoting path $T_5$, $T_5'$ of the corresponding arm 5. This situation is illustrated in FIG. 9, the pivoting direction of the rear wheels 3 around the pivot axes 17 being symbolized in FIG. 8 by the dotted bowed arrows.

If, as in the illustrated example, the pivot axes 17 of the wheels 3 are offset by a non-zero spacing 'e' with respect to the median plane P of the rear wheels 3, which is perpendicular to their axis of rotation R—see FIG. 8—, it is preferable that the braking system of the rear wheels 3 be deactivated for the entire duration of this first step. This prevents the tread of the tires of the wheels 3 from rubbing on the ground, as well as the digging of a furrow in the ground if it is soft.

In addition, the motorized rotation drive of the wheels 3 is activated during this first step to assist the change of direction of the wheels operated by the steering actuators of the wheels 3. This allows a smaller dimensioning of the latter.

Alternatively, it can be provided that the wheel steering actuators 3 alone ensure the change of orientation of the rear wheels 3. In this case, the wheels 3 are left freewheeling to roll freely on the ground during the orientation change operation. This avoids the need to synchronize the motorized rotation drive of the wheels 3 with the action of the steering actuators of the wheels 3.

Alternatively, it can be provided that the tangential orientation of the rear wheels 3 to the pivoting path $T_5$, $T_5'$ of the corresponding arm 5 is achieved exclusively by the motorized rotation drive of the rear wheels 3, i.e., without active participation of the steering actuators of the wheels 3. This also avoids having to synchronize the rotation drive of the wheels 3 with the action of the steering actuators of the wheels 3.

If, in contrast to the illustrated example, the pivot axes 15 were contained in the median plane P and intersected the axis of rotation R of the wheels 15, the first step is executed by means of the wheel steering actuators 3 alone, i.e., without motorized rotation drive of the wheels 3. Also, it is not useful in this case to deactivate the braking system of the wheels 3.

Once the first step 110 is finished, in other words when the wheels 3 are placed in a tangential orientation to the pivoting path $T_5$, $T_5'$ of the corresponding arm 5 as illustrated in FIG. 9, the on-board electronics initiate—cf. time $t_2$—a second step 120 which consists in pivoting the arms 5 to bring the wheels 3 into the extended position.

Figure 12:
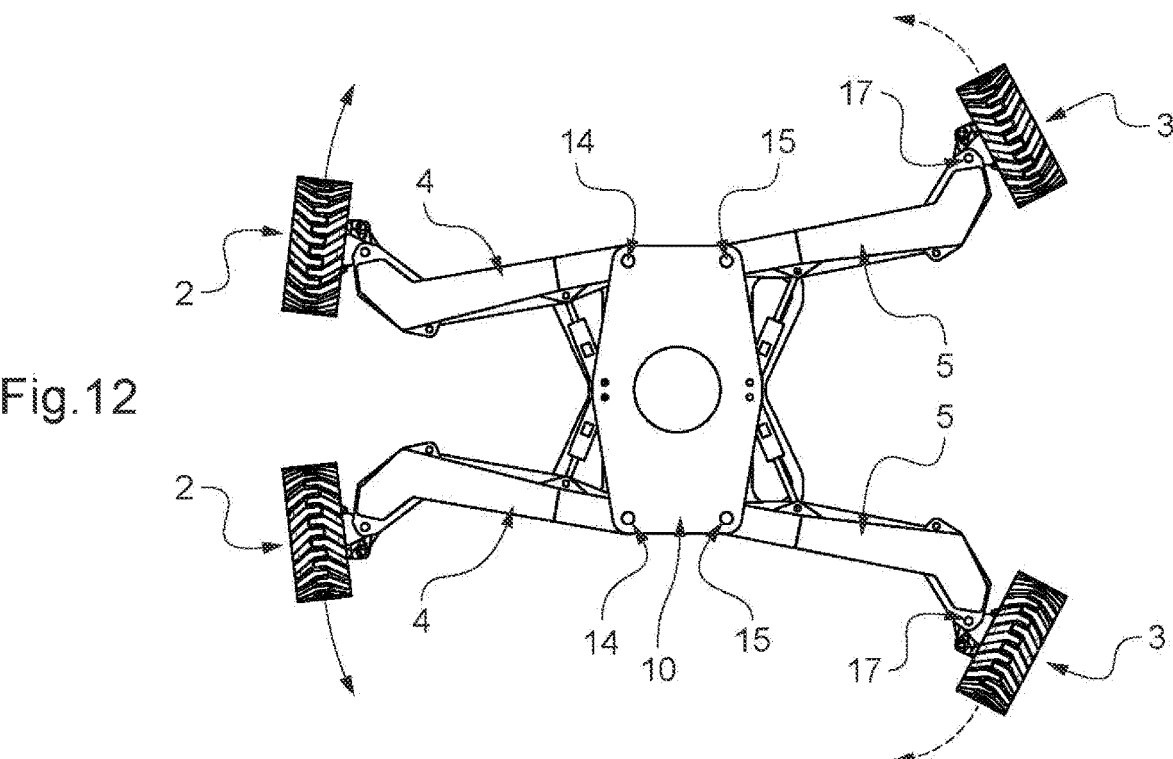
FIG. 12 represents a top view of the chassis, the wheels and their support arms being in a position at a time of the wheel extension method which is later than that of FIG. 11.

To do this, the on-board electronics deactivates the locking system for the pivoting of the arms 5 and causes the arms 5 to pivot to its pivoting position corresponding to the extended position of the wheels 3. This position is illustrated by FIG. 12. The braking system of the wheels 3 is deactivated during this second step 120 and the tangential orientation of the wheels 3 to the pivoting path $T_5$, $T_5'$ of the corresponding arm 5 is maintained throughout this second step 120.

The pivoting of the arms 5 can be caused solely by the actuators of the arms 5, i.e. in this case the cylinders 19. In this case, the wheels 3 are left freewheeling for the duration of the second step 120, which allows them to roll on the ground during the pivoting of the arms 5.

Conversely, the pivoting of the arms 5 can be caused solely by a motorized rotation drive of the wheels 3 so as to make them roll on the ground. The motorized rotation drive of the wheels 3 causes the pivoting of the arms 5 due to the tangential orientation of the wheels 3 to the pivoting trajectory $T_5$, $T_5'$ of the corresponding arm 5. In this variant, the dedicated actuators of the arms 5—i.e. in this case the cylinders 19—may be omitted.

But preferably, the pivoting of the arms 5 is caused by the combined action of the actuators of the arms 5—i.e. in this case the cylinders 19—and the motorized rotation drive of the wheels 3. This has the advantage of limiting the required power of both the actuators of the arms 5 and the driving motorization of the wheels 3.

In these three ways of causing the arms 5 to pivot, there is almost no friction between the tread of the tires of the wheels 3 and the ground, and the risk of digging a furrow in soft ground is almost zero.

The locking system for the pivoting of the arms 5 is activated at the end of the second step 120, i.e. when the arms 5 have reached their pivoting position corresponding to the extended position of the wheels 3.

Figure 13:
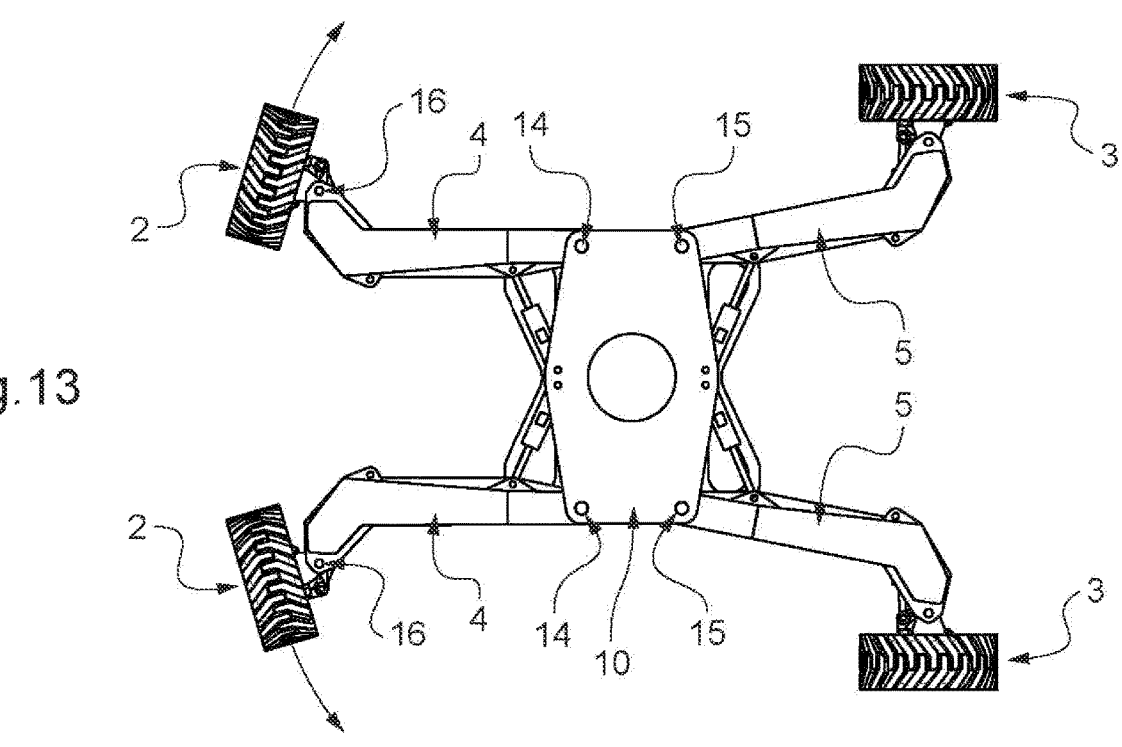
FIG. 13 represents a top view of the chassis, the wheels and their support arms being in a position at a time of the wheel extension method which is later than that of FIG. 12.

After the second step 120, the on-board electronics initiate a third step 130—see time $t_3$—which consists in changing again the orientation of the rear wheels 3 so as to make them adopt a direction of rolling on the ground corresponding to a direction of translation of the aerial work platform 1 on the ground. Preferably, the rear wheels 3 are returned to an orientation parallel to each other along the longitudinal axis L of the aerial work platform 1 as was the case in the initial step 100. In other words, the rear wheels 3 once again have a common rolling direction allowing a straight translation of the aerial work platform 1 on the ground in the forward AV or rearward AR direction. This situation is illustrated by FIG. 13 which corresponds to the moment when the rear wheels 3 have reached this new orientation.

The actuation operating the change of orientation of the rear wheels 3 during this third step 130 is executed in any of the ways described for the change of orientation of the rear wheels 3 operated during the first step 100.

At the end of the third step 130, the brake system of the rear wheels 3 is activated again.

Steps 110, 120 and 130 are specific to the extension of the rear wheels 3. The extension of the front wheels 2 is done in the same way as for the rear wheels 3. In other words, the same steps 110, 120 and 130 are applied mutatis mutandis to the front wheels 2, the steps having been correspondingly referenced 110', 120' and 130' in the flowchart in FIG. 16. The only difference is that steps 110', 120' and 130' are executed in a time-shifted manner with respect to steps 110, 120 and 130. As can be seen from the flowchart, the first step 110' for the front wheels 2 is initiated at a time $t_1'$ later than the time $t_1$ at which the first step 110 for the rear wheels 3 is initiated. As a result, the second and third steps 120' and 130' relating to the front wheels are also initiated at times $t_2'$ and $t_3'$ respectively subsequent to the times $t_2$ and $t_3$ of initiating steps 120 and 130 for the rear wheels 3, given also that the speed of execution of the various steps is preferably substantially the same for the front wheels 2 and the rear wheels 3. However, the execution speed could be different.

FIG. 10 represents the position of the arms 5 and the rear wheels 3 during the second step 120 at the time $t_1'$ when the first step 110' starts, i.e. at the beginning of the change of orientation of the front wheels 2 to orient them tangentially to the pivoting path of the corresponding arms 4. In this case, the time $t_1'$ is located between the times $t_2$ and $t_3$, but it could be different, for example between the times $t_1$ and $t_2$.

Figure 11:
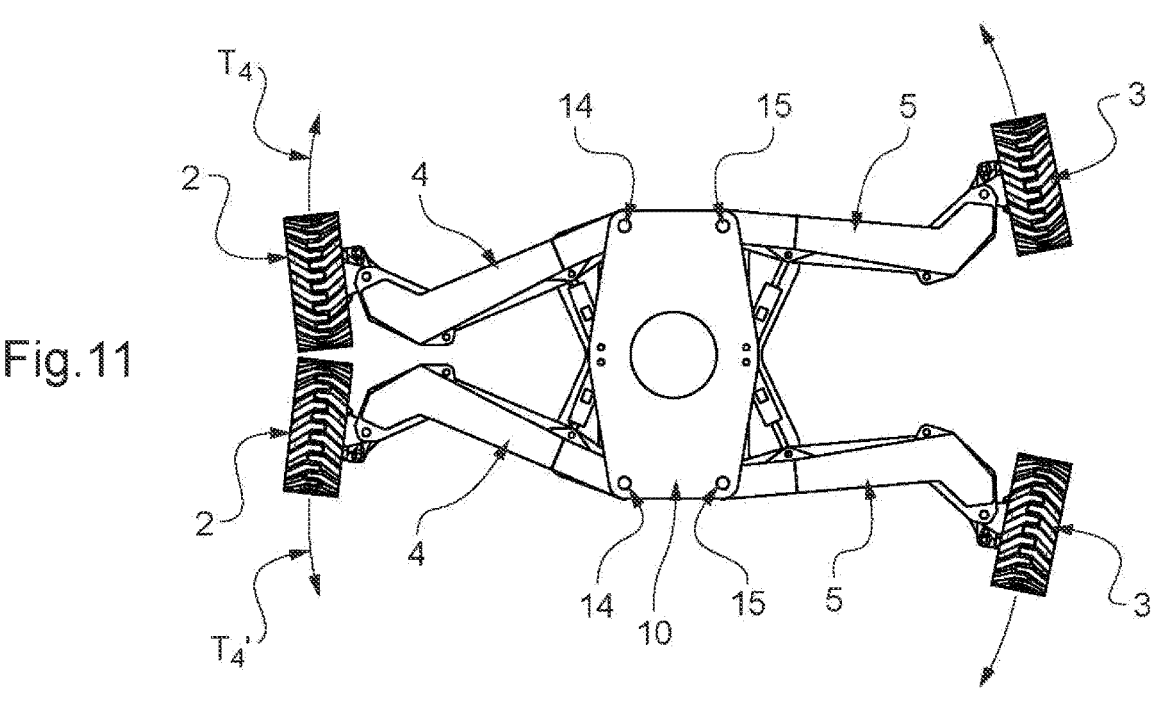
FIG. 11 represents a top view of the chassis, the wheels and their support arms being in a position at a time of the wheel extension method which is later than that of FIG. 10.

FIG. 11 represents the position of the arms 5 and the rear wheels 3 during the second step 120 at the time when the front wheels 2 reach at the end of step 110' a tangential orientation to the pivoting path of the corresponding arms 4.

FIG. 12 represents the position of the arms 4 and the front wheels 2 during the second step 120' at the time $t_3$ when the step 130 of reorienting the rear wheels 3 starts.

FIG. 13 represents the position of the arms 4 and the front wheels 2 during the second step 120' at the time $t_3$ when the rear wheels 3 have finished being reoriented during step 130.

Figure 14:
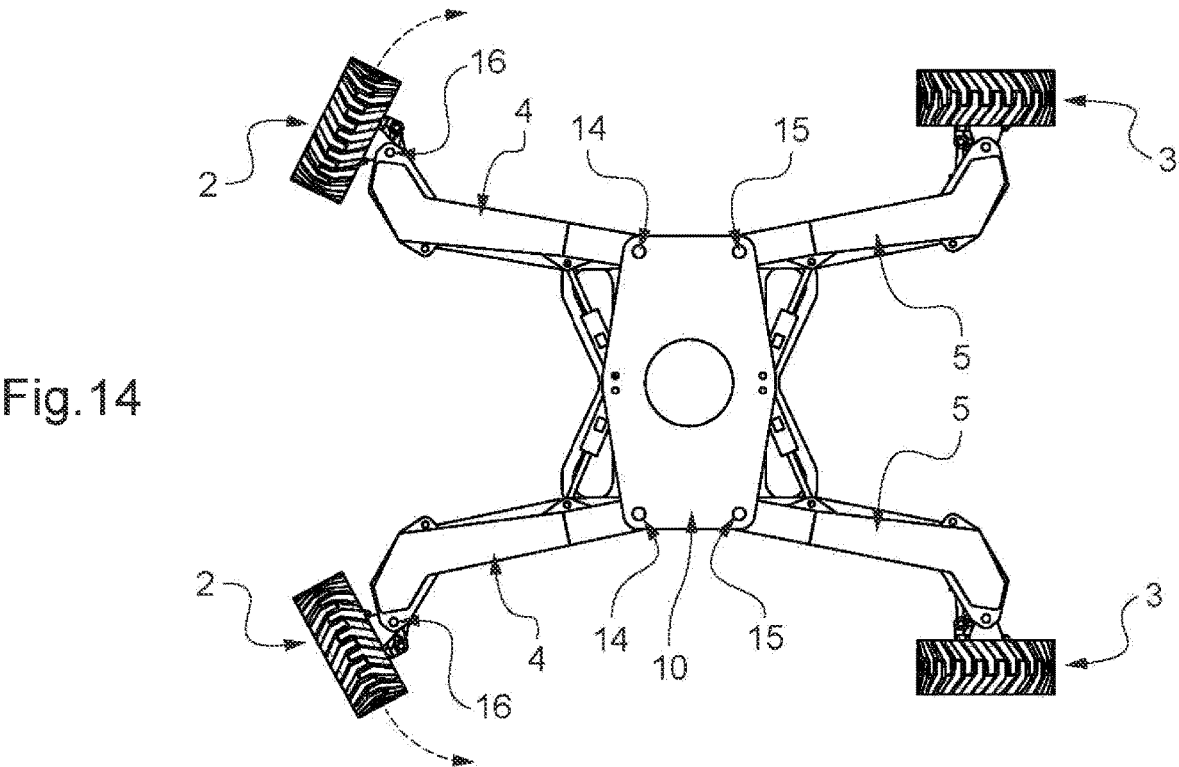
FIG. 14 represents a top view of the chassis, the wheels and their support arms being in a position at a time of the wheel extension method which is later than that of FIG. 13.

FIG. 14 represents the position of the arms 4 and the front wheels 2 at the time $t_3'$ when the reorientation of the front wheels 2 of the third step 130' begins while the rear wheels 3 have already been reoriented in step 130.

Figure 15:
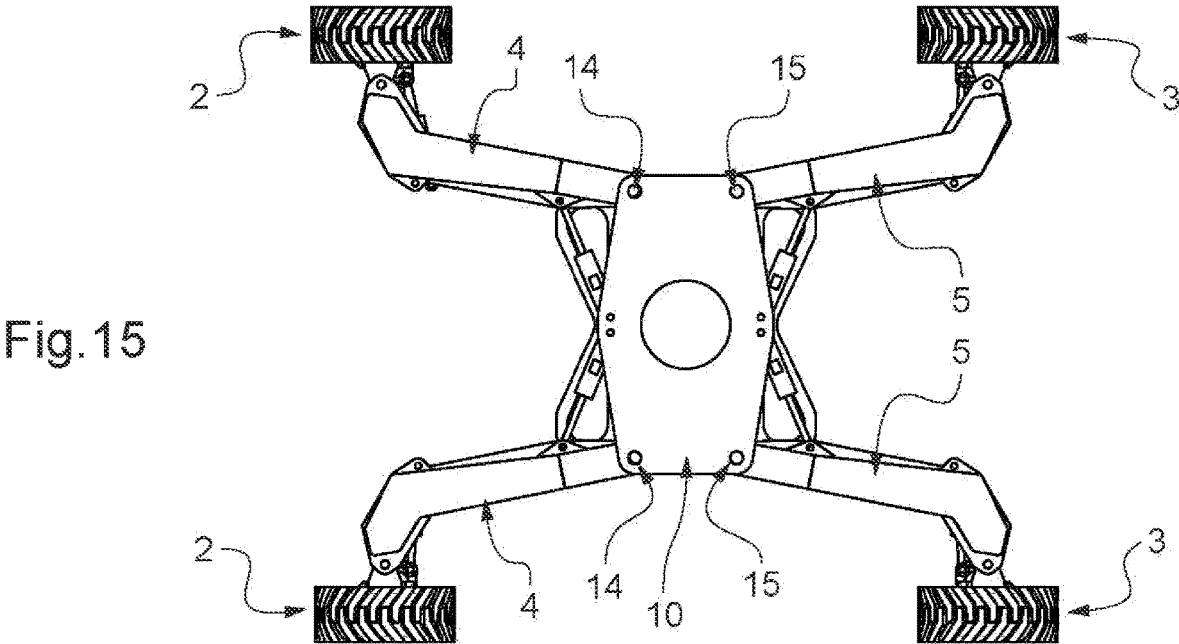
FIG. 15 represents a top view of the chassis, the wheels and their support arms being in a position at a time of the wheel extension method which is later than that of FIG. 14.

FIG. 15 represents the arms 4, 5 and the wheels 2, 3 in their final configuration after the execution of steps 130 and 130', i.e., where the wheels 2, 3 are in the extended and reoriented position, which corresponds to box 140 of the flowchart in FIG. 16.

The advantage of desynchronizing the extension of the front wheels 2 with respect to that of the rear wheels 3 is to exclude the risk that the aerial work platform 1 could move in translation under the effect of gravity if it rests on an inclined ground. Indeed, if the extension of the four wheels 3, 4 were synchronized, there would be moments during the extension operations at which the front wheels 2 and the rear wheels 3 are simultaneously freewheeling with a substantially identical or sufficiently close orientation so that there would be a risk that the aerial work platform 1 would move in translation.

This risk exists despite the use of a motorized rotation drive for the wheels 3 and 4 during all steps 110, 120 and 130 and 110', 120' and 130' if they were executed in a synchronized manner. Indeed, the transition between step 110 and step 120 requires a reversal of the direction of rotation of the rear wheels 3, and similarly for the corresponding steps for the front wheels 2. This reversal of direction of rotation implies a lapse of time of a few seconds during which the wheels 2, 3 are freewheeling before being effectively driven in rotation in the other direction. However, as can be seen in FIGS. 9 and 11 respectively, this situation occurs when the arms 5 and 4 are still stowed while the rear wheels 3 and the front wheels 2 are oriented tangentially to the pivoting path of the corresponding arm 4 or 5. As a result, the wheels 2, 3 have an orientation close to the perpendicular to the longitudinal axis L—or even corresponding to it depending on the design of the aerial work platform 1—which may allow a translation of the aerial work platform 1 under the effect of gravity if it rests on a ground inclined in this direction.

The duration of this risk situation is usually greater in the case where no motorized rotation drive of the wheels 3 and 4 is used during the steps 110, 120 and 130 and 110', 120' and 130'. It is therefore preferable to use a motorized rotation drive for the wheels 3 and 4 during all the steps 110, 120 and 130 and 110', 120' and 130' to limit the risk of displacement of the aerial work platform 1 under the effect of gravity from the start.

In any case, the desynchronization of the extension of the front wheels 2 with respect to that of the rear wheels 3 can be implemented in such a way as to exclude the risk of displacement of the aerial work platform 1 under the effect of gravity which has just been explained. Indeed, the desynchronization can be implemented in such a way that, at any time during the extension operations, at least one of the following conditions is satisfied:

the brake system of at least one wheel 2 or 3, more preferably of two wheels, is active,
    at least one wheel 2, 3, more preferably two wheels, is subject to a motorized rotation drive,
    the relative orientation of the wheels 2, 3 with respect to each other, i.e., their rolling direction, is sufficiently different to prevent a translation of the aerial work platform 1 on the ground under the effect of gravity on an inclined ground.

Each of these conditions is sufficient by itself to exclude a risk of translation of the aerial work platform 1 on the ground under the effect of gravity in the case where the aerial work platform 1 rests on an inclined ground.

Depending on the structural design of the chassis 10 and the arms 4, 5, there may also be a risk of the aerial work platform 1 pivoting on itself under the effect of gravity if it rests on an inclined ground while the wheels 2, 3 are all oriented tangentially to the pivoting trajectory of the corresponding arm 4, 5: this corresponds in our example to the part of the steps 120 and 120' which is executed in time overlap. Despite the fact that the pivoting paths of the arms 4, 5 are not exactly superimposed, this risk may exist when their pivoting axes 14, 15 are relatively close to each other compared to the length of the arms 4, 5. This risk can then be eliminated by subjecting at least one of the wheels 2, 3 to a motorized rotational drive at least during the moments when all the wheels 2, 3 are simultaneously in a tangential orientation to the pivoting path of the corresponding arm 4,

5. Another way to exclude this risk is to ensure that all the wheels 2, 3 are never simultaneously oriented tangentially to the pivoting path of the corresponding arm 4, 5, which however increases the duration of the extension operations of the wheels 2, 3.

The wheels 2, 3 are moved from their extended position to their retracted position by executing the method in reverse. The desynchronization of the movement of the front wheels 2 with respect to that of the rear wheels 3 provides the same advantages as those mentioned for extension.

The described method can be subject to many variants. For example, the steps of the method can be reversed in the sense that the extension of the front wheels 2 is initiated before that of the rear wheels 3. The third step 130, respectively 130', can also be omitted if it is not intended to move the aerial work platform 1 once the wheels 2, 3 have been extended to the working position. In this case, the braking system of the wheels 2 and/or 3 is activated at the end of steps 120 and 120'.

Alternatively, it may be provided that the movement of the wheels 2, 3 between the retracted and extended positions is operated by synchronizing a first pair of wheels with each other and a second pair of wheels with each other that are other than the front wheels 2 and the rear wheels 3 respectively. For example, the first pair of wheels may consist of the left side wheels 2, 3 and those of the second pair of wheels may consist of the right side wheels 2, 3. Or the first pair of wheels may consist of the left front wheel and the right rear wheel and the second pair of wheels may consist of the right front wheel and the left rear wheel. Of course, the movement of the first pair of wheels in relation to the second pair of wheels is desynchronized to achieve the above-mentioned advantages.

It is advantageous to synchronize the movement of a first pair of wheels with each other and the movement of a second pair of wheels with each other because it has been found that this limits the movements induced at the working platform 30 by the execution of the method of extending or retracting the wheels 2, 3, and consequently it limits the discomfort of the operator on board the working platform 30. But the method may also be implemented by desynchronizing the movement of all the wheels 2, 3 between them.

For the same reasons of limiting induced movements at the working platform 30, it has been found that it is preferable to initiate the extension or retraction of the second pair of wheels while the extension or retraction operations of the first pair of wheels are in progress. This has the additional advantage of reducing the time required to deploy the wheels 2, 3 compared to the case of initiating the extension or retraction steps of the second pair of wheels after the extension steps of the first pair of wheels are finished. It is also preferable that the pair of front wheels 2 and the pair of rear wheels 3 are respectively synchronized with each other.

Figure 17:
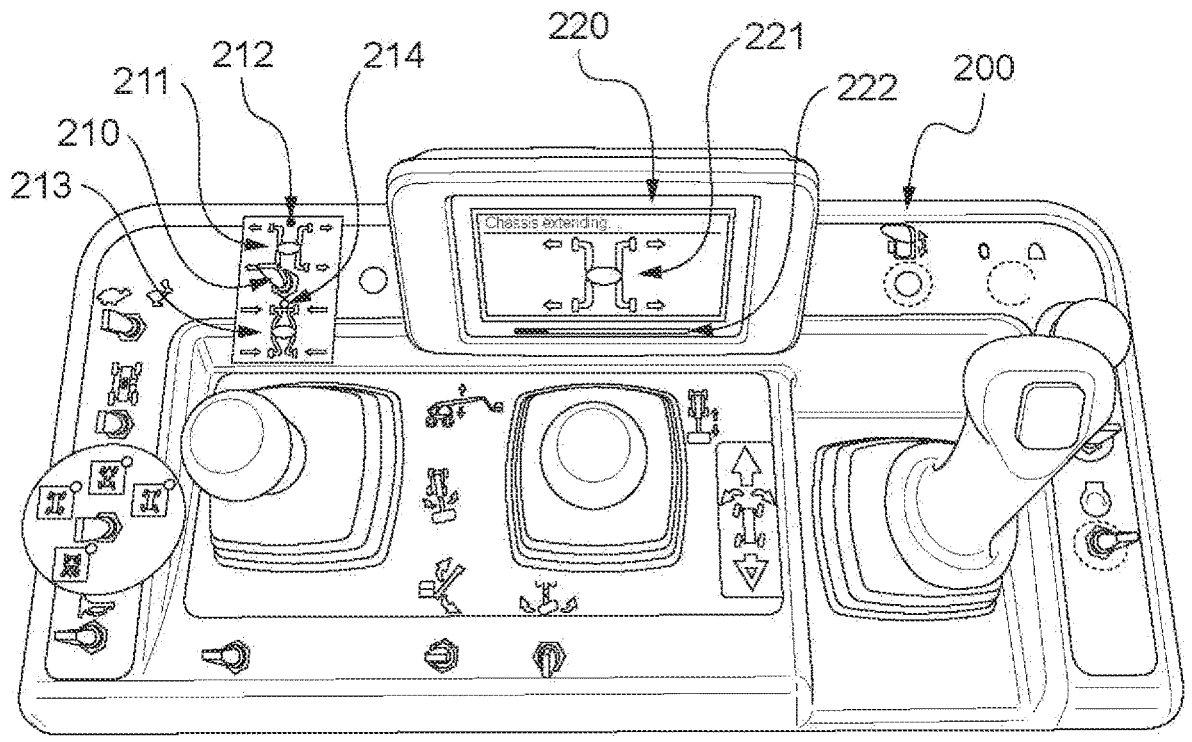
FIG. 17 represents the control console mounted on board the working platform of the aerial work platform.

FIG. 17 illustrates the control console 200 of the aerial work platform 1 that is mounted on board the working platform 30. It conventionally comprises control members allowing an operator to cause the working platform 30 to be lifted to height, as well as the movement of the aerial work platform 1 on the ground.

It also includes a control member 210 allowing the operator to initiate the extension or retraction of the wheels 2, 3. In this case, the control member 210 is a reversing switch with neutral central position of the lever push type. By pushing it up, the on-board electronics cause the wheels 2, 3 to extend as long as the operator holds it up. If he releases the lever of the switch, it returns to the neutral central position, in which case the on-board electronics stops the extension operations of wheels 2, 3 and resumes them when the operator pushes the lever up again. The operation is the same when the operator pushes the switch lever down to move wheels 2, 3 to the retracted position. This operation provides a security compared to the automatic character of the operations of extension or retraction of the wheels. Indeed, the operator only has to release the control member 210 to stop the extension or retraction operations of the wheels 2, 3 if he perceives any risk of collision of the wheels 2, 3 or the arms 4, 5 with an obstacle or a person. Moreover, the operator himself is protected against the risk of collision by the wheels 2, 3 or the arms 4, 5 by the fact that he has to remain permanently at the level of the control console 200 during the execution of these operations. Furthermore, the on-board electronics are preferably provided to prevent the lifting of a working platform of the aerial work platform in the event that the wheels 2, 3 are not all in the extreme extended position. If the execution of the wheel extension or retraction operations is interrupted by the on-board electronics due to the operator releasing the control and the wheels are not all in the extreme extended position, then the on-board electronics initiate a signaling informing the operator that the lifting of the working platform is prevented, for example on the display 220 mentioned below.

A marking 211, respectively 213, affixed above, respectively below; the switch symbolizes the extended, respectively retracted, position of the wheels 2, 3 and the arms 4, 5. The upper marking 211, respectively lower marking 213, is completed by arrows pointing in the direction of extension, respectively retraction, of the wheels 2, 3 and the arms 4, 5.

An indicator light 212, respectively 214, is arranged at the upper 211, respectively lower 213 marking. When the wheels 2, 3 are in the extended, respectively folded position, the indicator light 212, respectively 214, is lit continuously. Thus the operator is informed of the current position of the wheels 2, 3.

When the operator actuates the control member 210 to cause the wheels 2, 3 to be extended, respectively retracted, the on-board electronics lights up the indicator 212, respectively 214 in a flashing manner.

The control console 200 also includes a display 220. When the operator actuates the control member 210, the on-board electronics displays thereon a statement indicating that the extension or retraction operations of the wheels 2, 3 are in progress, as well as a graphic animation of the chassis 221 showing the progress of the extension or retraction operations of the wheels 2, 3 and the arms 4, 5. It also displays a progress bar 222 that increases or decreases in length as the extension or retraction operations of the wheels 2, 3 occur. When the extension or retraction operations of the wheels 2, 3 are completed, the on-board electronics display a corresponding message on the screen 220.

When the wheels 2, 3 are in the folded position without actuation of the control member 210, the on-board electronics displays an information on the screen 220 indicating that the lifting of the working platform 30 is not possible.

It will be understood that the control member 210 may be of a different type. For example, two separate switches may be provided, one to cause the wheels 2, 3 to extend and the other to retract the wheels 2, 3. According to another example, the launch of the extension or retraction operations of the wheels 2, 3 may be done by touching a dedicated display on the display screen 220.

It is also possible to provide for the remote launch of the extension or retraction operations of the wheels, for example by means of a smartphone in wireless communication link with the on-board electronics of the aerial work platform 1. Displays similar to those of the screen 220 may be provided on the smartphone screen.

In an alternative embodiment, the on-board electronics may be provided to, in case the operator releases the control member 210 during the execution of the steps 120 and before the extreme retracted or extended position of the wheels 2, 3 has been reached, continue the execution of the extension or retraction operations up to a modified end position of the wheels 2, 3 which is intermediate between the extreme retracted position and the extreme extended position. If the on-board electronics continues the execution of the method up to a modified end position of the wheels which is intermediate between the extreme retracted position and the extreme extended position, then the on-board electronics preferably prevents the lifting of the working platform 30 or limits a maximum height to which the operator can lift the working platform 30 with respect to the case when the wheels 2, 3 are all in the extreme extended position.

Of course, the present invention is not limited to the described and depicted examples and embodiment, but is susceptible to numerous variations accessible to the person skilled in the art.

The invention claimed is:

1. A method implemented by on-board electronics of an aerial work platform for moving a pair of front wheels and a pair of rear wheels of the aerial work platform between an initial position and an end position, one of which corresponds to a retracted position and the other to an extended position, the aerial work platform resting on the ground via the wheels with a spacing between the pair of front wheels and a spacing between the pair of rear wheels that is greater in the extended position than in the retracted position, the aerial work platform comprising a chassis and four arms each supporting a respective one of the wheels, each of the wheels being mounted at a first end of the corresponding arm, a second distal end of which is pivotally mounted to the chassis to move the wheel between the retracted position and the extended position along a pivoting path of the arm, each of the wheels having a ground rolling direction modifiable by a controlled change of orientation of the wheel with respect to the corresponding arm, the method comprising for each wheel the following successive steps:

a. changing an orientation of the wheel with respect to the corresponding arm to have an orientation tangential to the pivoting path of the corresponding arm, b. moving the wheel from the initial position to the end position by actuating the corresponding arm to pivot, a possible braking system of the wheel being inactive during the movement and the wheel being kept oriented tangentially to the pivoting path of the arm during the movement, and c. changing the orientation of the wheel with respect to the corresponding arm so that, after execution of step c) for all wheels, the wheels all have a ground rolling direction that corresponds to a common direction of travel of the aerial work platform on the ground, wherein the execution of steps a), b) and c) for all the wheels is desynchronized so that at any time from the beginning of step a) until the end of step c) for all the wheels, at least one of the following conditions is satisfied:

a brake system of at least one wheel is active, at least one wheel is subject to a motorized rotation drive, a relative orientation of the wheels with respect to each other prevents any translation of the aerial work platform on the ground under the effect of gravity, and wherein:

step b) is initiated synchronously for a first pair of wheels;

step b) is initiated synchronously for a second pair of wheels, the second pair of wheels being formed by the wheels other than the two wheels forming the first pair of wheels; and step b) is initiated for the second pair of wheels with a time shift with respect to the first pair of wheels.

2. The method according to claim 1, wherein the execution of steps a), b) and c) for all the wheels is desynchronized so that at any time from the beginning of step a) until the end of step c), at least one of the following conditions is satisfied:

a brake system of at least two wheels is active, at least two wheels are subject to a motorized rotation drive, a relative orientation of the wheels with respect to each other prevents any translation of the aerial work platform on the ground under the effect of gravity.

3. The method of claim 1, wherein step a) is initiated for each of the wheels before the execution of step b) is completed for any of the other wheels.

4. The method of claim 3, wherein the execution of step b) for each of the wheels at least partially overlaps in time with the execution of step b) for the other wheels.

5. The method of claim 1, wherein:

step b) is executed synchronously for the first pair of wheels; and step b) is executed synchronously for the second pair of wheels.

6. The method according to claim 1, wherein actuating the corresponding arm to pivot in step b) is executed:

by means of an actuator dedicated to the actuation of one or more arms, and/or by motorized rotation of the wheel corresponding to the arm.

7. The method according to claim 1, wherein for a wheel:

a change in ground rolling direction with respect to the corresponding arm is effected by pivoting the wheel with respect to a pivot axis which is offset with respect to a median plane of the wheel perpendicular to an axis of rotation of this wheel, and changing the orientation of the wheel with respect to the corresponding arm in step a) and/or step c) is achieved or assisted by a motorized rotation drive of the wheel.

8. The method according claim 1, which is executed by the on-board electronics upon actuation of at least one control by an operator, wherein the execution of the method is continued by the on-board electronics up to the end position of the wheels corresponding to an extreme retracted or extended position as long as the actuation of the control is maintained by the operator and is interrupted by the on-board electronics if the control is released by the operator before the extreme retracted or extended position of the wheels has been reached.

9. A method implemented by on-board electronics of an aerial work platform for moving a pair of front wheels and a pair of rear wheels of the aerial work platform between an initial position and an end position, one of which corresponds to a retracted position and the other to an extended position, the aerial work platform resting on the ground via the wheels with a spacing between the pair of front wheels and a spacing between the pair of rear wheels that is greater in the extended position than in the retracted position, the aerial work platform comprising a chassis and four arms each supporting a respective one of the wheels, each of the wheels being mounted at a first end of the corresponding arm, a second distal end of which is pivotally mounted to the chassis to move the wheel between the retracted position and the extended position along a pivoting path of the arm, each of the wheels having a ground rolling direction modifiable by a controlled change of orientation of the wheel with respect to the corresponding arm, the method comprising for each wheel the following successive steps:

a. changing an orientation of the wheel with respect to the corresponding arm to have an orientation tangential to the pivoting path of the corresponding arm, and b. moving the wheel from the initial position to the end position by actuating the corresponding arm to pivot, a possible braking system of the wheel being inactive during the movement and the wheel being kept oriented tangentially to the pivoting path of the arm during the movement, wherein the execution of steps a) and b) for all the wheels is desynchronized so that at any time from the beginning of step a) until the end of step b) for all the wheels, at least one of the following conditions is satisfied:

a brake system of at least one wheel is active, at least one wheel is subject to a motorized rotation drive, a relative orientation of the wheels with respect to each other prevents any translation of the aerial work platform on the ground under the effect of gravity, and wherein:

step b) is initiated synchronously for a first pair of wheels;

step b) is initiated synchronously for a second pair of wheels, the second pair of wheels being formed by the wheels other than the two wheels forming the first pair of wheels; and step b) is initiated for the second pair of wheels with a time shift with respect to the first pair of wheels.

10. The method according to claim 9, wherein the execution of steps a) and b) for all the wheels is desynchronized so that at any time from the beginning of step a) until the end of step b), at least one of the following conditions is satisfied:

a brake system of at least two wheels is active, at least two wheels are subject to a motorized rotation drive, a relative orientation of the wheels with respect to each other prevents any translation of the aerial work platform on the ground under the effect of gravity.

11. The method of claim 9, wherein step a) is initiated for each of the wheels before the execution of step b) is completed for any of the other wheels.

12. The method of claim 11, wherein the execution of step b) for each of the wheels at least partially overlaps in time with the execution of step b) for the other wheels.

13. The method of claim 9, wherein:

step b) is executed synchronously for the first pair of wheels; and step b) is executed synchronously for the second pair of wheels.

14. The method according to claim 9, wherein actuating the corresponding arm to pivot in step b) is executed:

by means of an actuator dedicated to the actuation of one or more arms, and/or by motorized rotation of the wheel corresponding to the arm.

15. The method according to claim 9, wherein for a wheel:

a change in ground rolling direction with respect to the corresponding arm is effected by pivoting the wheel with respect to a pivot axis which is offset with respect to a median plane of the wheel perpendicular to an axis of rotation of this wheel, and changing the orientation of the wheel with respect to the corresponding arm in step a) is achieved or assisted by a motorized rotation drive of the wheel.

16. The method according claim 9, which is executed by the on-board electronics upon actuation of at least one control by an operator, wherein the execution of the method is continued by the on-board electronics up to the end position of the wheels corresponding to an extreme retracted or extended position as long as the actuation of the control is maintained by the operator and is interrupted by the on-board electronics if the control is released by the operator before the extreme retracted or extended position of the wheels has been reached.

17. The method according to claim 16, wherein the on-board electronics prevents a lifting of a working platform of the aerial work platform if the wheels are not all in the extreme extended position.

18. A method implemented by on-board electronics of an aerial work platform for moving a pair of front wheels and a pair of rear wheels of the aerial work platform between an initial position and an end position, one of which corresponds to a retracted position and the other to an extended position, the aerial work platform resting on the ground via the wheels with a spacing between the pair of front wheels and a spacing between the pair of rear wheels that is greater in the extended position than in the retracted position, the aerial work platform comprising a chassis and four arms each supporting a respective one of the wheels, each of the wheels being mounted at a first end of the corresponding arm, a second distal end of which is pivotally mounted to the chassis to move the wheel between the retracted position and the extended position along a pivoting path of the arm, each of the wheels having a ground rolling direction modifiable by a controlled change of orientation of the wheel with respect to the corresponding arm, the method comprising for each wheel the following successive steps:

a. changing an orientation of the wheel with respect to the corresponding arm to have an orientation tangential to the pivoting path of the corresponding arm, and b. moving the wheel from the initial position to the end position by actuating the corresponding arm to pivot, a possible braking system of the wheel being inactive during the movement and the wheel being kept oriented tangentially to the pivoting path of the arm during the movement, wherein the execution of steps a) and b) for all the wheels is desynchronized so that at any time from the beginning of step a) until the end of step b) for all the wheels, at least one of the following conditions is satisfied:

a brake system of at least one wheel is active, at least one wheel is subject to a motorized rotation drive, a relative orientation of the wheels with respect to each other prevents any translation of the aerial work platform on the ground under the effect of gravity, and wherein the method executed by the on-board electronics upon actuation of at least one control by an operator, wherein the execution of the method is continued by the on-board electronics up to an end position of the wheels corresponding to an extreme retracted or extended position as long as the actuation of the control is maintained by the operator, and if the control is released by the operator during the execution of step b) for each of the wheels before the extreme retracted or extended position of the wheels has been reached, the on-board electronics continue the execution of the method up to a modified end position of the wheels which is intermediate between the extreme retracted position and the extreme extended position and either prevents the lifting of a working platform of the aerial work platform or limit a maximum height to which the operator can lift the working platform with respect to the case when the wheels are all in the extreme extended position.

19. A method implemented by on-board electronics of an aerial work platform for moving a pair of front wheels and a pair of rear wheels of the aerial work platform between an initial position and an end position, one of which corresponds to a retracted position and the other to an extended position, the aerial work platform resting on the ground via the wheels with a spacing between the pair of front wheels and a spacing between the pair of rear wheels that is greater in the extended position than in the retracted position, the aerial work platform comprising a chassis and four arms each supporting a respective one of the wheels, each of the wheels being mounted at a first end of the corresponding arm, a second distal end of which is pivotally mounted to the chassis to move the wheel between the retracted position and the extended position along a pivoting path of the arm, each of the wheels having a ground rolling direction modifiable by a controlled change of orientation of the wheel with respect to the corresponding arm, the method comprising for each wheel the following successive steps:

a. changing an orientation of the wheel with respect to the corresponding arm to have an orientation tangential to the pivoting path of the corresponding arm, and b. moving the wheel from the initial position to the end position by actuating the corresponding arm to pivot, a possible braking system of the wheel being inactive during the movement and the wheel being kept oriented tangentially to the pivoting path of the arm during the movement, wherein the execution of steps a) and b) for all the wheels is desynchronized so that at any time from the beginning of step a) until the end of step b) for all the wheels, at least one of the following conditions is satisfied:

a brake system of at least one wheel is active, at least one wheel is subject to a motorized rotation drive, a relative orientation of the wheels with respect to each other prevents any translation of the aerial work platform on the ground under the effect of gravity, and wherein:

step a) is initiated for each of the wheels before the execution of step b) is completed for any of the other wheels, and the execution of step b) for each of the wheels at least partially overlaps in time with the execution of step b) for the other wheels.

20. The method of claim 19, wherein:

step b) is executed synchronously for the first pair of wheels; and step b) is executed synchronously for the second pair of wheels.

*   *   *   *   *